United States Patent
Nam et al.

(10) Patent No.: US 12,047,798 B2
(45) Date of Patent: Jul. 23, 2024

(54) TECHNIQUES TO ENHANCE BEAM REPORTING FOR NON-COMMUNICATION SIGNALS

(71) Applicant: QUALCOMM Incorporated, San Diego, CA (US)

(72) Inventors: Wooseok Nam, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 234 days.

(21) Appl. No.: 17/410,759

(22) Filed: Aug. 24, 2021

(65) Prior Publication Data

US 2022/0070708 A1 Mar. 3, 2022

Related U.S. Application Data

(60) Provisional application No. 63/073,035, filed on Sep. 1, 2020.

(51) Int. Cl.
*H04W 24/10* (2009.01)
*H04B 7/06* (2006.01)
*H04W 24/08* (2009.01)

(52) U.S. Cl.
CPC .......... *H04W 24/10* (2013.01); *H04B 7/0626* (2013.01); *H04B 7/063* (2013.01); *H04W 24/08* (2013.01)

(58) Field of Classification Search
CPC ..... H04W 24/10; H04W 24/08; H04W 64/00; H04B 7/06; H04B 7/063; H04B 7/0695; H04B 7/0417; H04B 7/0632; H04B 7/0639; H04L 27/261; H04L 25/0224; H04L 5/0048; G01S 5/0036; G01S 5/0273
See application file for complete search history.

(56) References Cited

U.S. PATENT DOCUMENTS

| | | | | |
|---|---|---|---|---|
| 2019/0053234 | A1* | 2/2019 | Cui | H04W 72/0446 |
| 2019/0380054 | A1* | 12/2019 | Manolakos | H04L 5/0094 |

OTHER PUBLICATIONS

International Search Report and Written Opinion—PCT/US2021/047539—ISA/EPO—Dec. 6, 2021 (207728WO).

\* cited by examiner

*Primary Examiner* — Ayanah S George
(74) *Attorney, Agent, or Firm* — Dalei Dong; Holland & Hart LLP

(57) ABSTRACT

Methods, systems, and devices for wireless communications are described. A user equipment (UE) may receive, from a network node, such as a base station or another UE, one or more reference signals. The reference signals may be examples of sensing reference signals (SRSs) or positioning reference signals (PRSs). The UE may identify a time of arrival (TOA) parameter value associated with each of the one or more references signals, and the UE may prioritize each of the one or more reference signals based on the TOA parameter value associated with each of the one or more reference signals. In some cases, the UE may perform a channel measurement procedure, and may transmit a report including the results of the measurement, to the network node. The report may include TOA parameter values associated with each of the one or more reference signals received from the network node.

29 Claims, 15 Drawing Sheets ated systems, devices, and apparatuses that enhance beam reporting for non-communication signals, such as reference signals. The described techniques provide for a user equipment (UE) to receive, from a network node, one or more non-communication signals. The non-communication signals may be examples of sensing reference signals (SRSs) or positioning reference signals (PRSs). The network node may

TECHNIQUES TO ENHANCE BEAM REPORTING FOR NON-COMMUNICATION SIGNALS

CROSS REFERENCE

The present Application for Patent claims the benefit of U.S. Provisional Patent Application No. 63/073,035 by NAM et al., entitled "TECHNIQUES TO ENHANCE BEAM REPORTING FOR NON-COMMUNICATION SIGNALS," filed Sep. 1, 2020, assigned to the assignee hereof, which is hereby incorporated by reference in its entirety.

FIELD OF TECHNOLOGY

The following relates to wireless communications, including techniques to enhance beam reporting for non-communication signals.

FIELD OF DISCLOSURE

The present disclosure, for example, relates to wireless communication system, more particularly to techniques to enhance beam reporting for non-communication signals.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Wireless devices, such as UEs, in a wireless communication system, may perform radio-frequency (RF) sensing, to estimate distance, speed, and angle of target devices. Reference signals, such as sensing reference signals (SRSs) and positioning reference signals (PRSs) may be used by wireless devices to perform RF sensing procedures.

SUMMARY

The described techniques relate to improved methods, systems, devices, and apparatuses that enhance beam reporting for non-communication signals, such as reference signals. The described techniques provide for a user equipment (UE) to receive, from a network node, one or more non-communication signals. The non-communication signals may be examples of sensing reference signals (SRSs) or positioning reference signals (PRSs). The network node may be a base station or another UE. The UE may identify a time of arrival (TOA) parameter value associated with each of the one or more non-communications signals, and the UE may prioritize each of the one or more non-communication signals based on the TOA parameter value associated with each of the one or more non-communication signals. In some cases, the UE may perform a channel measurement procedure, and may transmit a report including the results of the measurement, to the network node. The report may include TOA parameter values associated with each of the one or more non-communication signals received from the network node.

A method of wireless communications at a UE is described. The method may include receiving, from a network node, one or more reference signals, identifying a TOA parameter value associated with each of the one or more reference signals, and prioritizing each of the one or more reference signals based on the TOA parameter value associated with each of the one or more reference signals.

In some examples of the method, the reference signals include at least one of reference signals for sensing, reference signals for positioning, or a combination thereof.

Some examples of the method may further include performing one or more channel measurements of a set of resources based on the one or more reference signals, and transmitting a report to the network node including one or more indices of the one or more reference signals and the TOA parameter values associated with each of the one or more reference signals, where the report may be based on the prioritizing.

In some examples of the method, the report includes a reference signal receive power (RSRP) measurement, a signal to interference noise ratio (SINR) measurement, a signal to noise ratio (SNR) measurement, a channel quality indicator (CQI), a pre-coding matrix indicator (PMI), or a combination thereof.

In some examples of the method, the report may be a channel state information report.

In some examples of the method, the prioritizing may include ranking the one or more reference signals based on the associated TOA parameter value.

Some examples of the method may further include determining the reference signal associated with an earliest TOA parameter value, quantizing the smallest TOA parameter value to a first bit value, and quantizing the other TOA parameter values to a second bit value, where the second bit value may be smaller than the first bit value.

Some examples of the method may further include determining that two of the one or more channel measurements correspond to the same reference signal, and transmitting the report including the same index of the reference signal for each of the two of the one or more channel measurements, where the same index includes the associated TOA parameter values for each of the two of the one or more channel measurements.

In some examples of the method, the report comprises a single instance of the same index indicating the reference signal for each of the two of the one or more channel measurements.

In some examples of the method, the associated TOA parameter values for each of the two of the one or more channel measurements corresponding to the same reference signals may be different.

In some examples of the method, the set of resources include may be based on a configuration of a set of parameters indicated in the one or more reference signals.

In some examples of the method, the set of parameters include quasi-colocation information indicating a beam corresponding to the reference signal, a source node index of the network node corresponding to the one or more reference signal, time resource information, frequency resource information, periodicity information, repetition information, transmission power, a scrambling sequence, or a combination thereof.

In some examples of the method, the network node may be a serving base station, a neighboring base station, or a second UE.

An apparatus for wireless communications at a UE is described. The apparatus may include a processor, memory coupled with the processor, and instructions stored in the memory. The instructions may be executable by the processor to cause the apparatus to receive, from a network node, one or more reference signals, identify a TOA parameter value associated with each of the one or more reference signals, and prioritize each of the one or more reference signals based on the TOA parameter value associated with each of the one or more reference signals.

In some examples of the apparatus, the reference signals include at least one of reference signals for sensing, reference signals for positioning, or a combination thereof.

Some examples of the apparatus may further include operations for performing one or more channel measurements of a set of resources based on the one or more reference signals, and transmitting a report to the network node including one or more indices of the one or more reference signals and the TOA parameter values associated with each of the one or more reference signals, where the report may be based on the prioritizing.

In some examples of the apparatus, the report includes a reference signal receive power (RSRP) measurement, a signal to interference noise ratio (SINR) measurement, a signal to noise ratio (SNR) measurement, a channel quality indicator (CQI), a pre-coding matrix indicator (PMI), or a combination thereof.

In some examples of the apparatus, the report may be a channel state information report.

In some examples of the apparatus, the prioritizing may include ranking the one or more reference signals based on the associated TOA parameter value.

Some examples of the apparatus may further include determining the reference signal associated with an earliest TOA parameter value, quantizing the smallest TOA parameter value to a first bit value, and quantizing the other TOA parameter values to a second bit value, where the second bit value may be smaller than the first bit value.

Some examples of the apparatus may further include instructions for determining that two of the one or more channel measurements correspond to the same reference signal, and transmitting the report including the same index of the reference signal for each of the two of the one or more channel measurements, where the same index includes the associated TOA parameter values for each of the two of the one or more channel measurements.

In some examples of the apparatus, the report comprises a single instance of the same index indicating the reference signal for each of the two of the one or more channel measurements.

In some examples of the apparatus, the associated TOA parameter values for each of the two of the one or more channel measurements corresponding to the same reference signals may be different.

In some examples of the apparatus, the set of resources include may be based on a configuration of a set of parameters indicated in the one or more reference signals.

In some examples of the apparatus, the set of parameters include quasi-colocation information indicating a beam corresponding to the reference signal, a source node index of the network node corresponding to the one or more reference signal, time resource information, frequency resource information, periodicity information, repetition information, transmission power, a scrambling sequence, or a combination thereof.

In some examples of the apparatus, the network node may be a serving base station, a neighboring base station, or a second UE.

Another apparatus for wireless communications at a UE is described. The apparatus may include means for receiving, from a network node, one or more reference signals, identifying a TOA parameter value associated with each of the one or more reference signals, and prioritizing each of the one or more reference signals based on the TOA parameter value associated with each of the one or more reference signals.

In some examples of the apparatus, the reference signals include at least one of reference signals for sensing, reference signals for positioning, or a combination thereof.

Some examples of the apparatus may further include means for performing one or more channel measurements of a set of resources based on the one or more reference signals, and transmitting a report to the network node including one or more indices of the one or more reference signals and the TOA parameter values associated with each of the one or more reference signals, where the report may be based on the prioritizing.

In some examples of the apparatus, the report includes a RSRP measurement, a SINR measurement, a SNR measurement, a CQI, a PMI, or a combination thereof.

In some examples of the apparatus, the report may be a channel state information report.

In some examples of the apparatus, the prioritizing may include means for ranking the one or more reference signals based on the associated TOA parameter value.

Some examples of the apparatus described herein may further include means for determining the reference signal associated with an earliest TOA parameter value, quantizing the smallest TOA parameter value to a first bit value, and quantizing the other TOA parameter values to a second bit value, where the second bit value may be smaller than the first bit value.

Some examples of the apparatus described herein may further include means for determining that two of the one or more channel measurements correspond to the same reference signal, and transmitting the report including the same index of the reference signal for each of the two of the one or more channel measurements, where the same index includes the associated TOA parameter values for each of the two of the one or more channel measurements.

In some examples of the apparatus, the report comprises a single instance of the same index indicating the reference signal for each of the two of the one or more channel measurements.

In some examples of the apparatus, the associated TOA parameter values for each of the two of the one or more channel measurements corresponding to the same reference signals may be different.

In some examples of the apparatus, the set of resources include may be based on a configuration of a set of parameters indicated in the one or more reference signals.

In some examples of the apparatus, the set of parameters include quasi-colocation information indicating a beam corresponding to the reference signal, a source node index of the network node corresponding to the one or more reference signal, time resource information, frequency resource information, periodicity information, repetition information, transmission power, a scrambling sequence, or a combination thereof.

In some examples of the apparatus, the network node may be a serving base station, a neighboring base station, or a second UE.

A non-transitory computer-readable medium storing code for wireless communications at a UE is described. The code may include instructions executable by a processor to receive, from a network node, one or more reference signals, identify a TOA parameter value associated with each of the one or more reference signals, and prioritize each of the one or more reference signals based on the TOA parameter value associated with each of the one or more reference signals.

In some examples of the non-transitory computer-readable medium described herein, the reference signals include at least one of reference signals for sensing, reference signals for positioning, or a combination thereof.

Some examples of the non-transitory computer-readable medium described herein may further include instructions for performing one or more channel measurements of a set of resources based on the one or more reference signals, and transmitting a report to the network node including one or more indices of the one or more reference signals and the TOA parameter values associated with each of the one or more reference signals, where the report may be based on the prioritizing.

In some examples of the non-transitory computer-readable medium described herein, the report includes a RSRP measurement, a SINR measurement, a SNR measurement, a CQI, a PMI, or a combination thereof.

In some examples of the non-transitory computer-readable medium described herein, the report may be a channel state information report.

In some examples of the non-transitory computer-readable medium described herein, the prioritizing may include instructions for ranking the one or more reference signals based on the associated TOA parameter value.

Some examples of the non-transitory computer-readable medium described herein may further include instructions for determining the reference signal associated with an earliest TOA parameter value, quantizing the smallest TOA parameter value to a first bit value, and quantizing the other TOA parameter values to a second bit value, where the second bit value may be smaller than the first bit value.

Some examples of the non-transitory computer-readable medium described herein may further include instructions for determining that two of the one or more channel measurements correspond to the same reference signal, and transmitting the report including the same index of the reference signal for each of the two of the one or more channel measurements, where the same index includes the associated TOA parameter values for each of the two of the one or more channel measurements.

In some examples of the non-transitory computer-readable medium described herein, the report comprises a single instance of the same index indicating the reference signal for each of the two of the one or more channel measurements.

In some examples of the non-transitory computer-readable medium described herein, the associated TOA parameter values for each of the two of the one or more channel measurements corresponding to the same reference signals may be different.

In some examples of the non-transitory computer-readable medium described herein, the set of resources include may be based on a configuration of a set of parameters indicated in the one or more reference signals.

In some examples of the non-transitory computer-readable medium described herein, the set of parameters include quasi-colocation information indicating a beam corresponding to the reference signal, a source node index of the network node corresponding to the one or more reference signal, time resource information, frequency resource information, periodicity information, repetition information, transmission power, a scrambling sequence, or a combination thereof.

In some examples of the non-transitory computer-readable medium described herein, the network node may be a serving base station, a neighboring base station, or a second UE.

A method of wireless communications at a network node is described. The method may include generating one or more reference signals for transmission to a user equipment, where each of the one or more reference signals include a configuration for performing channel measurement, transmitting, to one or more UEs, the one or more reference signals, and receiving, from at least one of the one or more UEs, a report including one or more indices of the one or more reference signals and TOA parameter values associated with each of the one or more reference signals.

In some examples of the method, the reference signals include at least one of reference signals for sensing, reference signals for positioning, or a combination thereof.

In some examples of the method, the network node may be a serving base station, a neighboring base station, or a second UE.

In some examples of the method, the configuration includes a set of parameters including at least one of quasi-colocation information indicating a beam corresponding to the reference signal, a source node index of the network node corresponding to the one or more reference signal, time resource information, frequency resource information, periodicity information, repetition information, transmission power, a scrambling sequence, or a combination thereof.

In some examples of the method, the report includes a RSRP measurement, a SINR measurement, a SNR measurement, a CQI, a PMI, or a combination thereof.

In some examples of the method, the report may be a channel state information report.

In some examples of the method, the report includes the same index of the reference signal for each of the two of the one or more channel measurements, where the same index includes the associated TOA parameter values for each of the two of the one or more channel measurements.

In some examples of the method, the report comprises a single instance of the same index indicating the reference signal for each of the two of the one or more channel measurements.

In some examples of the method, the associated TOA parameter values for each of the two of the one or more reference signals may be different.

An apparatus for wireless communications at a network node is described. The apparatus may include a processor, memory coupled with the processor, and instructions stored in the memory. The instructions may be executable by the processor to cause the apparatus to generate one or more reference signals for transmission to a user equipment, where each of the one or more reference signals include a configuration for performing channel measurement, transmit, to one or more UEs, the one or more reference signals, and receive, from at least one of the one or more UEs, a report including one or more indices of the one or more reference signals and TOA parameter values associated with each of the one or more reference signals.

In some examples of the apparatus, the reference signals include at least one of reference signals for sensing, reference signals for positioning, or a combination thereof.

In some examples of the apparatus, the network node may be a serving base station, a neighboring base station, or a second UE.

In some examples of the apparatus, the configuration includes a set of parameters including at least one of quasi-colocation information indicating a beam corresponding to the reference signal, a source node index of the network node corresponding to the one or more reference signal, time resource information, frequency resource information, periodicity information, repetition information, transmission power, a scrambling sequence, or a combination thereof.

In some examples of the apparatus, the report includes a RSRP measurement, a SINR measurement, a SNR measurement, a CQI, a PMI, or a combination thereof.

In some examples of the apparatus, the report may be a channel state information report.

In some examples of the apparatus, the report includes the same index of the reference signal for each of the two of the one or more channel measurements, where the same index includes the associated TOA parameter values for each of the two of the one or more channel measurements.

In some examples of the apparatus, the report comprises a single instance of the same index indicating the reference signal for each of the two of the one or more channel measurements.

In some examples of the apparatus, the associated TOA parameter values for each of the two of the one or more reference signals may be different.

Another apparatus for wireless communications at a network node is described. The apparatus may include means for generating one or more reference signals for transmission to a user equipment, where each of the one or more reference signals include a configuration for performing channel measurement, transmitting, to one or more UEs, the one or more reference signals, and receiving, from at least one of the one or more UEs, a report including one or more indices of the one or more reference signals and TOA parameter values associated with each of the one or more reference signals.

In some examples of the apparatus, the reference signals include at least one of reference signals for sensing, reference signals for positioning, or a combination thereof.

In some examples of the apparatus, the network node may be a serving base station, a neighboring base station, or a second UE.

In some examples of the apparatus, the configuration includes a set of parameters including at least one of quasi-colocation information indicating a beam corresponding to the reference signal, a source node index of the network node corresponding to the one or more reference signal, time resource information, frequency resource information, periodicity information, repetition information, transmission power, a scrambling sequence, or a combination thereof.

In some examples of the apparatus, the report includes a RSRP measurement, a SINR measurement, a SNR measurement, a CQI, a PMI, or a combination thereof.

In some examples of the apparatus, the report may be a channel state information report.

In some examples of the apparatus, the report includes the same index of the reference signal for each of the two of the one or more channel measurements, where the same index includes the associated TOA parameter values for each of the two of the one or more channel measurements.

In some examples of the apparatus, the report comprises a single instance of the same index indicating the reference signal for each of the two of the one or more channel measurements.

In some examples of the apparatus, the associated TOA parameter values for each of the two of the one or more reference signals may be different.

A non-transitory computer-readable medium storing code for wireless communications at a network node is described. The code may include instructions executable by a processor to generate one or more reference signals for transmission to a user equipment, where each of the one or more reference signals include a configuration for performing channel measurement, transmit, to one or more UEs, the one or more reference signals, and receive, from at least one of the one or more UEs, a report including one or more indices of the one or more reference signals and TOA parameter values associated with each of the one or more reference signals.

In some examples of the non-transitory computer-readable medium, the reference signals include at least one of reference signals for sensing, reference signals for positioning, or a combination thereof.

In some examples of the non-transitory computer-readable medium, the network node may be a serving base station, a neighboring base station, or a second UE.

In some examples of the non-transitory computer-readable medium, the configuration includes a set of parameters including at least one of quasi-colocation information indicating a beam corresponding to the reference signal, a source node index of the network node corresponding to the one or more reference signal, time resource information, frequency resource information, periodicity information, repetition information, transmission power, a scrambling sequence, or a combination thereof.

In some examples of the non-transitory computer-readable medium, the report includes a RSRP measurement, a SINR measurement, a SNR measurement, a CQI, a PMI, or a combination thereof.

In some examples of the non-transitory computer-readable medium, the report may be a channel state information report.

In some examples of the non-transitory computer-readable medium, the report includes the same index of the reference signal for each of the two of the one or more channel measurements, where the same index includes the associated TOA parameter values for each of the two of the one or more channel measurements.

In some examples of the non-transitory computer-readable medium, the report comprises a single instance of the same index indicating the reference signal for each of the two of the one or more channel measurements.

In some examples of the non-transitory computer-readable medium, the associated TOA parameter values for each of the two of the one or more reference signals may be different.

DETAILED DESCRIPTION

Figure 1:
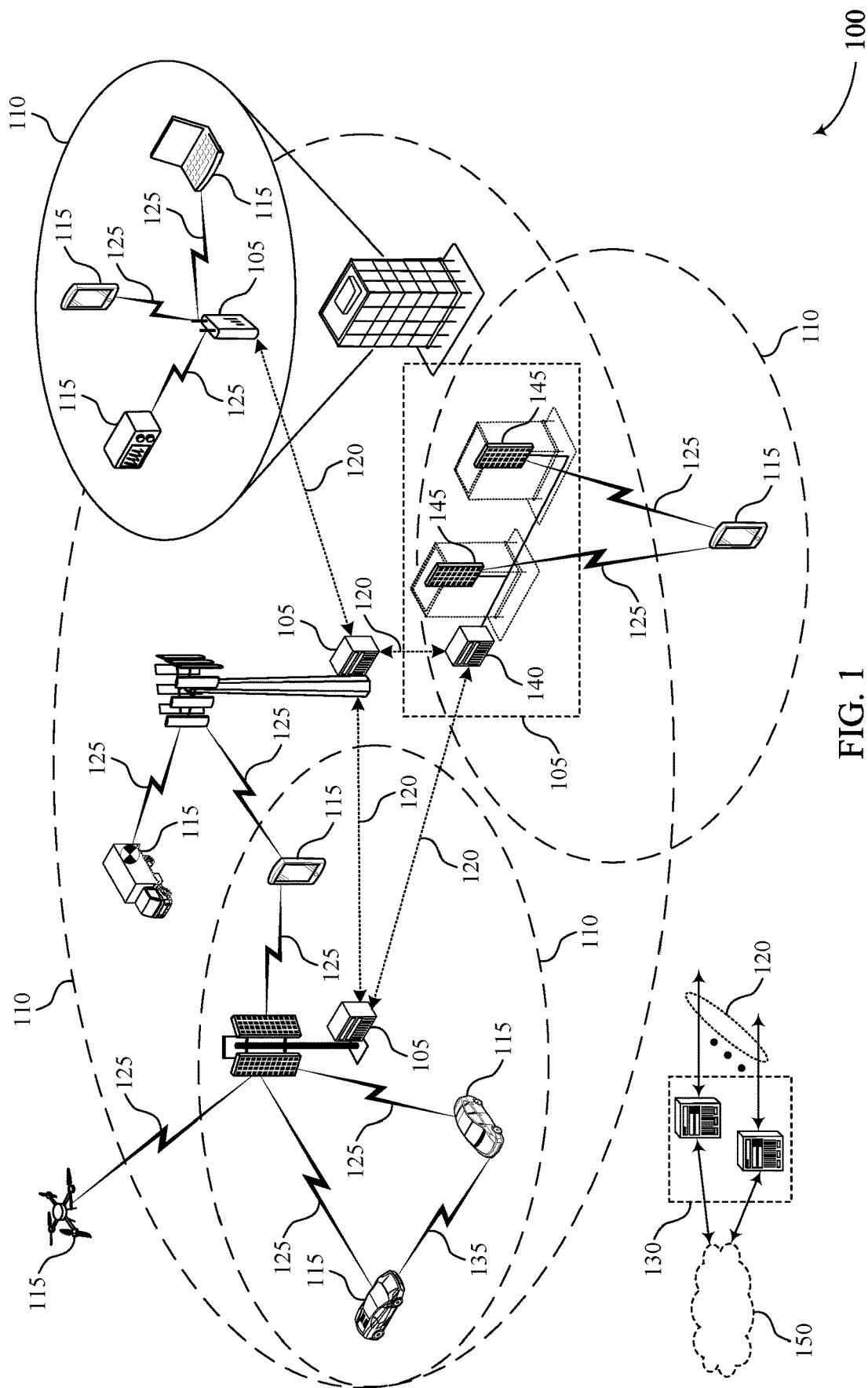
FIG. 1 illustrates an example of a wireless communications system that supports techniques to enhance beam reporting for non-communication signals in accordance with various aspects of the present disclosure.

Wireless devices in a wireless communication system may perform radio-frequency (RF) sensing. RF sensing may include examples of consumer-level radar, with advanced detection capabilities. For example, RF sensing may enable touchless and device-free interaction of a wireless device, such as a user equipment (UE), with other devices and objects in the wireless communication system. The UE may reuse RF waveforms used for communication, such as waveforms used for communication with a base station. For example, the UE may use millimeter wave (mmW) RF ranges to perform distance or range detection. RF sensing may be used for health monitoring (e.g., heartbeat detection and respiration rate monitoring), gesture recognition (e.g., human activity recognition keystroke detection, sign language recognition), contextual information acquisition (e.g., location detection or tracking, direction finding, range estimation, angle estimation), and automotive radar (e.g., smart cruise control, collision avoidance).

In order to perform the described RF sensing and detection, a wireless communications system may implement usage of non-communication signals, such as reference signals. Example of reference signals may include sensing reference signals (SRSs) or positioning reference signals (PRSs). Different reference signals may have different configurations, and may be used for different applications. For example, different reference signals may perform better in measuring values of range, or velocity, or angle.

The non-communication signals may be transmitted and received by beams of wireless devices in a beamforming system. In the example of monostatic radar, a first wireless device may transmit a reference signals (for RF sensing) using a first beam, and may receive the reflection of the reference signal (e.g., reflected off of a sensed object) using the same first beam. In this example, the wireless device may manage the beams used separately from beam management for communications. In the example of bistatic radar, a first wireless device may transmit the non-communication signals using a transmit beam of the wireless device, and the reflection of the reference signal may be received by a second wireless device using a receive beam of the wireless device, after reflecting off of a detected object. In this example, beam management may include management of both the transmit beam of the transmitting device and the receive beam of the receiving device. This beam management for the non-communication signals may be different than beam management for communication signals between these two wireless devices.

Further, the wireless device receiving the non-communication signals, such as a UE, may perform channel reporting to the network node transmitting the non-communication signals. The UE may use a channel state information (CSI) framework. The CSI framework may include a resource setting, indicating a configuration of a list of CSI-reference signal (CSI-RS) resources sets to measure. The CSI framework may also include a CSI reporting setting, including a configuration of time and frequency domain behavior, and other parameters related to reporting the measurements. The CSI framework may also include a measurement link, indicating an association between the CSI resource setting and the CSI reporting setting. In some cases, the beam management configuration may rely on the CSI framework. In these cases, the reporting quantity (e.g., measurement report by the receiving UE) may include layer 1 (L1) reference signal received power (RSRP), L1 signal to interference noise ratio (SINR) or another quantity, or a combination of measurement quantities.

The CSI framework may indicate a beam measurement and reporting configuration for communication signals, such as downlink or uplink control and data channels, but may not include a configuration framework for the measurement and reporting of non-communication signals, such as PRSs or SRSs. The CSI framework may be enhanced to enable the configuration of non-communication procedures, such as RF sensing using PRSs and SRSs.

Thus, a single or a set of non-communication signals may be configured as part of a resource setting (e.g., the CSI resource setting). The non-communication signals in the resource setting may be non-communication signals from a number of different network nodes, include a serving cell base station, a neighboring cell base station (e.g., a non-serving cell base station) or one or more other UEs or wireless devices). Each non-communication signal may include a configuration of a set of parameters to measure.

The reporting setting (e.g., the CSI reporting setting) may also include enhanced reporting setting for non-communication signals. For example, the report quantities to be reported by the UE receiving the non-communication reference signals may also include time of arrival (TOA) parameters, along with other quantities.

Aspects of the disclosure are initially described in the context of wireless communications systems. Aspects of the disclosure may then be described in the context of process flows. Aspects of the disclosure are further illustrated by and described with reference to apparatus diagrams, system diagrams, and flowcharts that relate to techniques to enhance beam reporting for non-communication signals.

FIG. 1 illustrates an example of a wireless communications system 100 that supports techniques to enhance beam reporting for non-communication signals in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell may cover a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, which may be in the range of 300 megahertz (MHz) to 300 gigahertz (GHz). The region from 300 MHz to 3 GHz may be known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), an unlicensed radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may receive, from a network node, one or more non-communication signals. The non-communication signals may be examples of SRSs or PRSs. The UE 115 may identify a TOA parameter value associated with each of the one or more non-communications signals, and the UE 115 may prioritize each of the one or more non-communication signals based on the TOA parameter value associated with each of the one or more non-communication signals. In some cases, the UE 115 may perform a channel measurement procedure, and may transmit a report including the results of the measurement, to a network node, such as a base station 105 or another UE 115. The report may include TOA parameter values associated with each of the one or more non-communication signals received from the network node.

Figure 2:
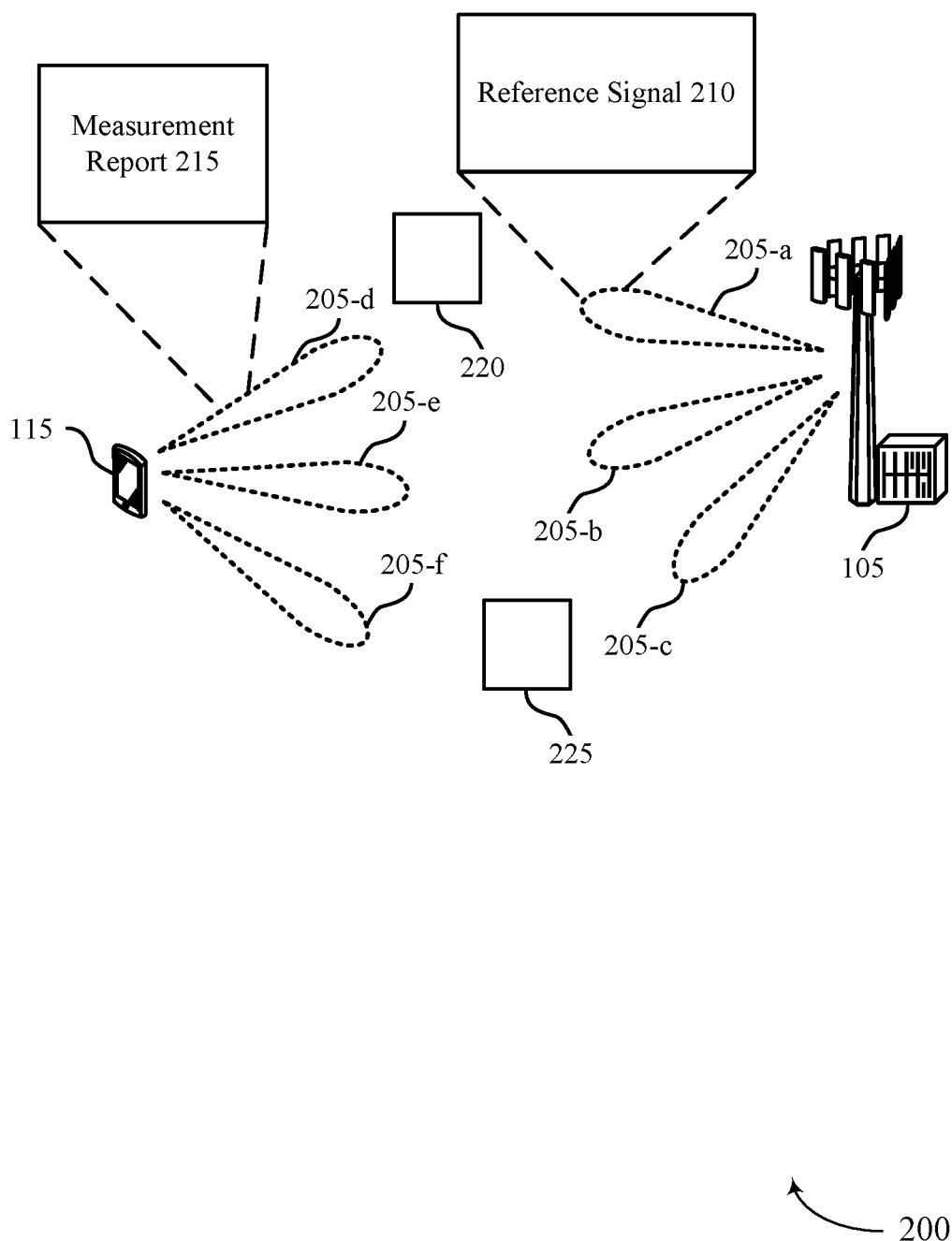
FIG. 2 illustrates an example of a wireless communications system that supports techniques to enhance beam reporting for non-communication signals in accordance with various aspects of the present disclosure.

FIG. 2 illustrates an example of a wireless communications system 200 that supports techniques to enhance beam reporting for non-communication signals in accordance with various aspects of the present disclosure. In some examples, wireless communications system 200 may implement aspects of wireless communications system 100. Wireless communications system 200 includes a UE 115, which may be an example of a UE 115 as described with respect to FIG. 1. Wireless communications system 200 also includes a base station 105, which may be an example of a base station 105 as described with respect to FIG. 1. Base station 105 may be a serving base station of UE 115, a neighboring (e.g., non-serving) base station of UE 115, or, in some cases, base station 105 may be another UE 115, or a different network node. Base station 105 may communicate in a beam-forming communication system, using a set of beams including beam 205-*a*, beam 205-*b*, and beam 205-*c*. UE 115 may also communicate in a beam-forming communication system, using beam 205-*d*, beam 205-*e*, and beam 205-*f*.

Base station 105 may transmit and receive using beam 205-*a*, beam 205-*b*, and beam 205-*c*. Base station 105 may transmit and receive both communication signals, such as data or control signals, and non-communication signals, such as reference signals for RF sensing and detection. UE 115 may also transmit and receive using beam 205-*d*, beam 205-*e*, and beam 205-*f*. Using a beam, such as beam 205-*a*, base station 105 may transmit a reference signal 210. Base station 105 may transmit multiple non-communication signals, by transmitting a reference signal 210 on each beam 205. The non-communication signals may be reference signals, such as PRSs, SRSs, or another type of reference signal.

Each reference signal 210 may be a part of a configured resource setting. The resource setting may be a resource set of a channel measurement resource (CMR), that a receiving device, such as UE 115, may use to measure channel information. Each non-communication signal may also include one or more of configuration of quasi-colocation (QCL) information (e.g., beam identification information), a source node index (e.g., identification information of base station 105), time and frequency resource information, including periodicity information and repetition information, transmission power information, a scrambling sequence, other parameters, or a combination of these. UE 115 may receive each of the reference signals 210 using one or more of beam 205-*d*, beam 205-*e*, or beam 205-*f*.

The one or more reference signals 210 may be used to RF sensing, such as for sensing objects. For example, base station 105 may transmit reference signal 210 using beam 205-*a*. The non-communication signal may be reflected off of object 220. UE 115 may receive the reflected signal using beam 205-*d*. UE 115 may perform measurements on the received reflected signals, and thus identify attributes of object 220. For example, UE 115 may identify a speed, location, angle, or other parameters of object 220. UE 115 may transmit a measurement report 215 including identification information of the reference signals 210, including the measured parameters of the received reflected signals, which may describe object 220. Similarly, base station 105 may transmit reference signal 210 using beam 205-*c*. This reference signal 210 may be reflected off of object 225, and UE 115 may receive the reflected signals using a beam of UE 115, such as beam 205-*f*. UE 115 may measure parameters of the received reflected signal, to identify attributes of object 225. UE 115 may transmit measurement report 215 to base station 105 including an identification of the received reference signal 210, and the measured parameters.

UE 115 may identify a set of report quantities based on the non-communication reference signals, or based on a pre-configuration (e.g., a reporting setting of a CSI framework, or another measurement framework). UE 115 may measure report quantities of received reference signals 210 (such as reference signals 210 reflected off of object 220 or object 225). The reporting setting may include a time of arrival (TOA) parameter. UE 115 may identify a TOA parameter value associated with each received reference signal 210. The reporting setting may also include other quantities for measurement by UE 115, including one or more of RSRP, SINR, or SNR. UE 115 may measure each of the quantities for each reference signal 210.

UE 115 may transmit, using one of beam 205-*d*, beam 205-*e*, or beam 205-*f*, a measurement report 215 to base station 105. More than one reference signal 210 may be reported by UE 115 in measurement report 215. For example, measurement report 215 may include multiple indices corresponding to each non-communication signal. Each index may identify the non-communication signal. The measurement report 215 may therefore include measurement values for each reference signal 210. The measurement report 215 may include the measured report quantities, including TOA, RSRP, SINR, and other parameters, for each reference signal 210.

The reported reference signals 210 may be ranked according to reporting quality. For example, the non-communications signals may be ranked in order of the corresponding TOA parameter value, where the reference signal 210 with the earliest TOA parameter value may be ranked highest. In this example, the earliest TOA parameter value (e.g., corresponding to reference signal 210 received first) may be quantized to a bit value (e.g., a x-bit value), and the TOA parameter values ranked lower than the earliest TOA parameter value (e.g., corresponding to reference signals 210 received later in time) may be quantized to other bit values (e.g., y-bit values) which may be less than the value corresponding to the earliest TOA parameter value. The reference signals 210 may also be ranked according to other parameters, alone or in combination, such as RSRP, SINR, SNR, or other measurements. These value may be quantized similarly to the described quantization of the TOA parameter value.

In some cases, UE 115 may receive a signal identifying target object 220 (e.g., a reference signal 210 reflected off of object 220), and receive a signal identifying target object 225 (e.g., a reference signal 210 reflected off of object 225). In some cases, the same reference signal 210 (e.g., a reference signal 210 transmitted by beam 205-*b* of base station 105) may reflect off of object 220 and object 225, and UE 115 may receive two reflected signals of the same non-communication signal. UE 115 may received the reflections at different times. Thus, UE 115 may received two signals, corresponding to the same index (identifying the single non-communication signal), with two different TOA parameter values. In this case, UE 115 may report two sets of measurement quantities, corresponding to the same index, with different TOA parameters values included. UE 115 may transmit measurement report 215 including indices of each received reference signal 210, in an order of a measured parameter value, such as the TOA parameter value.

Figure 3:
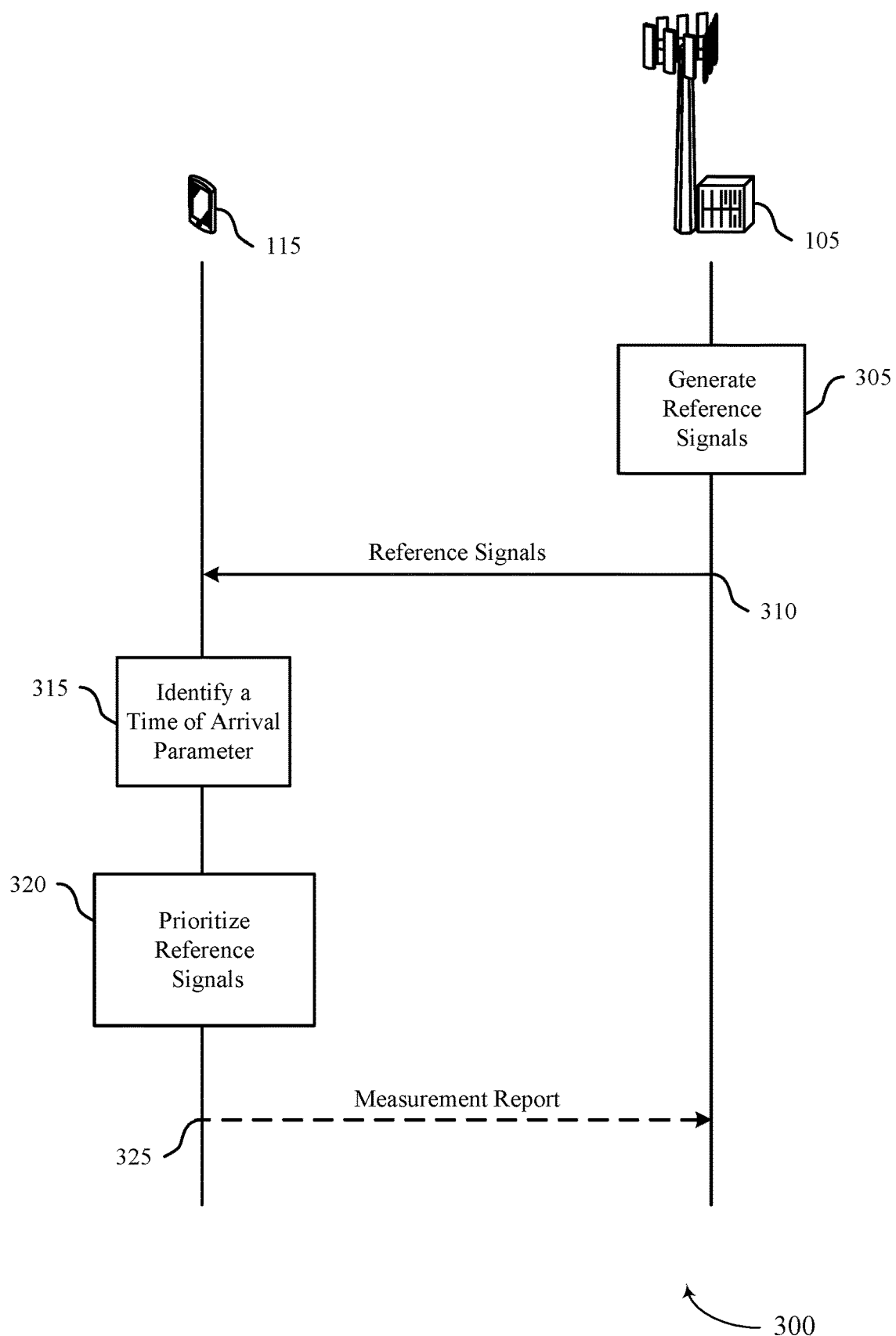
FIG. 3 illustrates an example of a process flow that supports techniques to enhance beam reporting for non-communication signals in accordance with various aspects of the present disclosure.

FIG. 3 illustrates an example of a process flow 300 that supports techniques to enhance beam reporting for non-communication signals in accordance with aspects of the present disclosure. In some examples, process flow 300 may implement aspects of wireless communications system 100 and wireless communications system 200. Process flow 300 includes a UE 115 and a base station 105, which may be examples of UEs 115 and base stations 105, as described with respect to FIGS. 1 and 2. Base station 105 may be a serving base station of UE 115, a neighboring (e.g., non-serving) base station of UE 115, a UE 115, or another network node.

At 305, base station 105 may generate one or more reference signals for transmission to UE 115, where each of the one or more reference signals includes a configuration for performing channel measurement. The reference signals may be one of a SRS, a PRS, a combination of an SRS or a PRS, or another type of reference signal or non-communication signal.

At 310, base station 105 may transmit, to one or more UEs, the one or more reference signals to UE 115. UE 115 may receive, from the base station, the one or more reference signals.

At 315, UE 115 may identify a TOA parameter value associated with each of the one or more reference signals. UE 115 may identify the TOA parameter value as part of performing one or more channel measurements of a set of resources based on the one or more reference signals. The set of resources may be based on a configuration of a resource setting including a set of parameters indicated in the one or more reference signals. The set of parameters may include QCL information indicating a beam corresponding to the reference signal, a source node index of the base station 105 (e.g., the network node), time resource information, frequency resource information, periodicity information, repetition information, transmission power, a scrambling sequence, or a combination of these.

At 320, UE 115 may prioritize each of the one or more reference signals based on the TOA parameter value associated with each of the one or more reference signals. UE 115 may rank the one or more reference signals based on the associated TOA parameter value. UE 115 may determine the reference signal associated with an earliest TOA parameter value. UE 115 may then quantize the earliest TOA parameter value to a first bit value, an quantize the other TOA parameter values to a second bit value, where the second bit value is smaller than the first bit value.

At 325, UE 115 may transmit a report to the base station 105 (e.g., a network node) based on a reporting setting, including one or more indices of the one or more reference signals and the TOA parameter values associated with each of the one or more reference signals. The report may be based on the prioritizing at 320. The report may include, along with the TOA parameter values, a RSRP measurement, a SINR measurement, a SNR measurement, a channel quality indicator (CQI), a pre-coding matrix indicator (PMI), or a combination of these. The report may be a CSI report.

In some examples, UE 115 may determine that two of the one or more channel measurements correspond to the same reference signal. In these examples, UE 115 may transmit the report including the same index of the non-communication signal for each of the two of the one or more channel measurements, where the same index includes the associated TOA parameter value for each of the two of the one or more channel measurements. The report may include a single instance of the same index indicating the reference signal for each of the two of the one or more channel measurements. The associated TOA parameter values for each of the two of the one or more channel measurements may be different.

Figure 4:
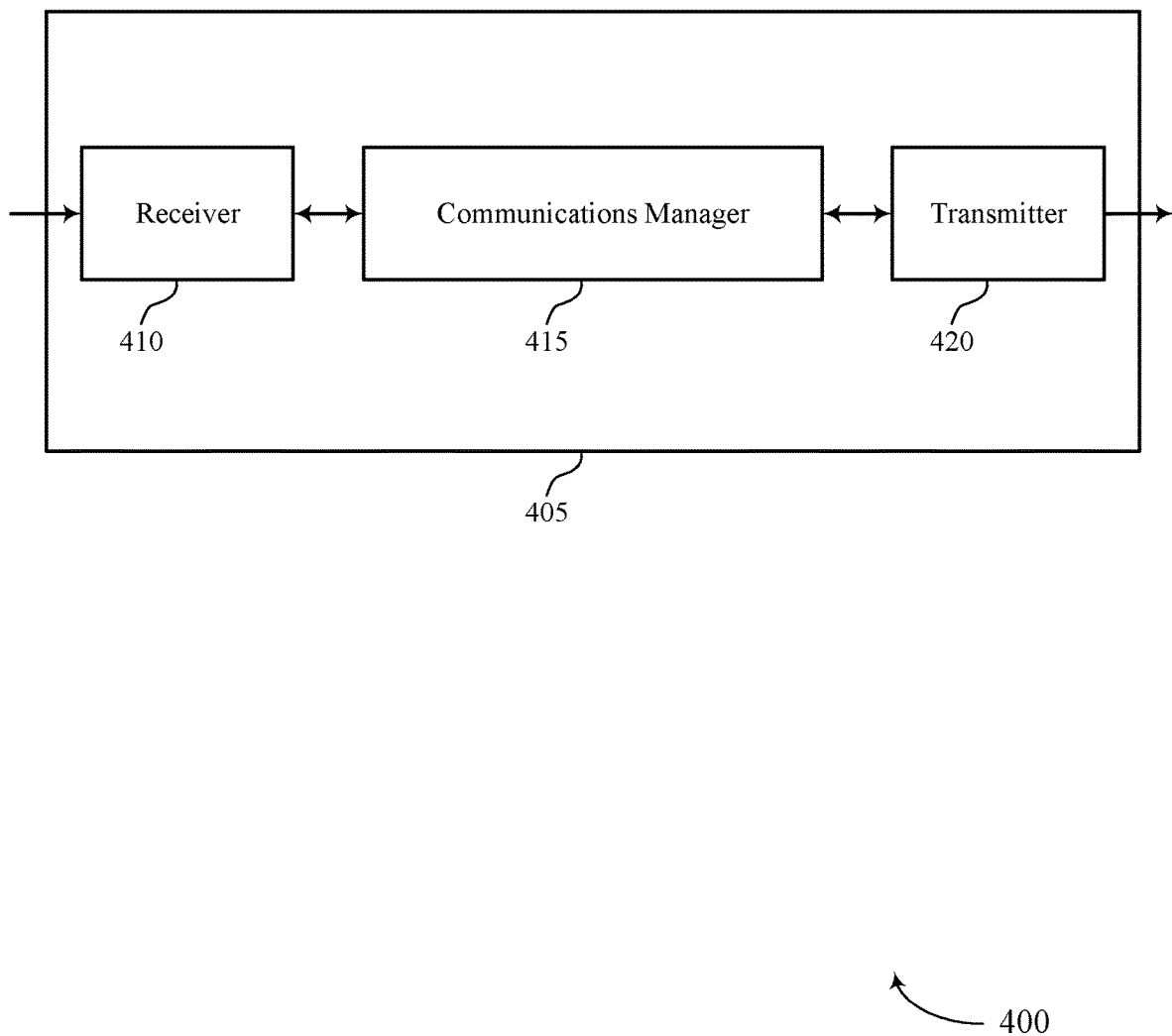
FIGS. 4 and 5 show block diagrams of devices that support techniques to enhance beam reporting for non-communication signals in accordance with various aspects of the present disclosure.

FIG. 4 shows a block diagram 400 of a device 405 that supports techniques to enhance beam reporting for reference signals in accordance with various aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to techniques to enhance beam reporting for reference signals, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may receive, from a network node, one or more reference signals, identify a time of arrival parameter value associated with each of the one or more reference signals, and prioritize each of the one or more reference signals based on the time of arrival parameter value associated with each of the one or more reference signals. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver component. For example, the transmitter 420 may be an example of aspects of the transceiver 720 described with reference to FIG. 7. The transmitter 420 may utilize a single antenna or a set of antennas.

In some examples, the communications manager 415 described herein may be implemented as a chipset of a wireless modem, and the receiver 410 and the transmitter 420 may be implemented as sets of analog components (e.g., amplifiers, filters, phase shifters, antennas, etc.). The wireless modem may obtain and decode signals from the receiver 410 over a receive interface, and may output signals for transmission to the transmitter 420 over a transmit interface.

The actions performed by the communications manager 415 as described herein may be implemented to realize one or more potential advantages. One implementation may allow a UE 115 to save power and increase battery life by improving the speed and efficiency with which a UE 115 may perform wireless detection and sensing. The UE 115 may report measurement quantities to a network node, indicating attributes of detection objects in a wireless communications system. The measurement report may include further measurement parameters, and the UE 115 may operate according to a configuration, which may aid in reporting efficiency.

Figure 5:
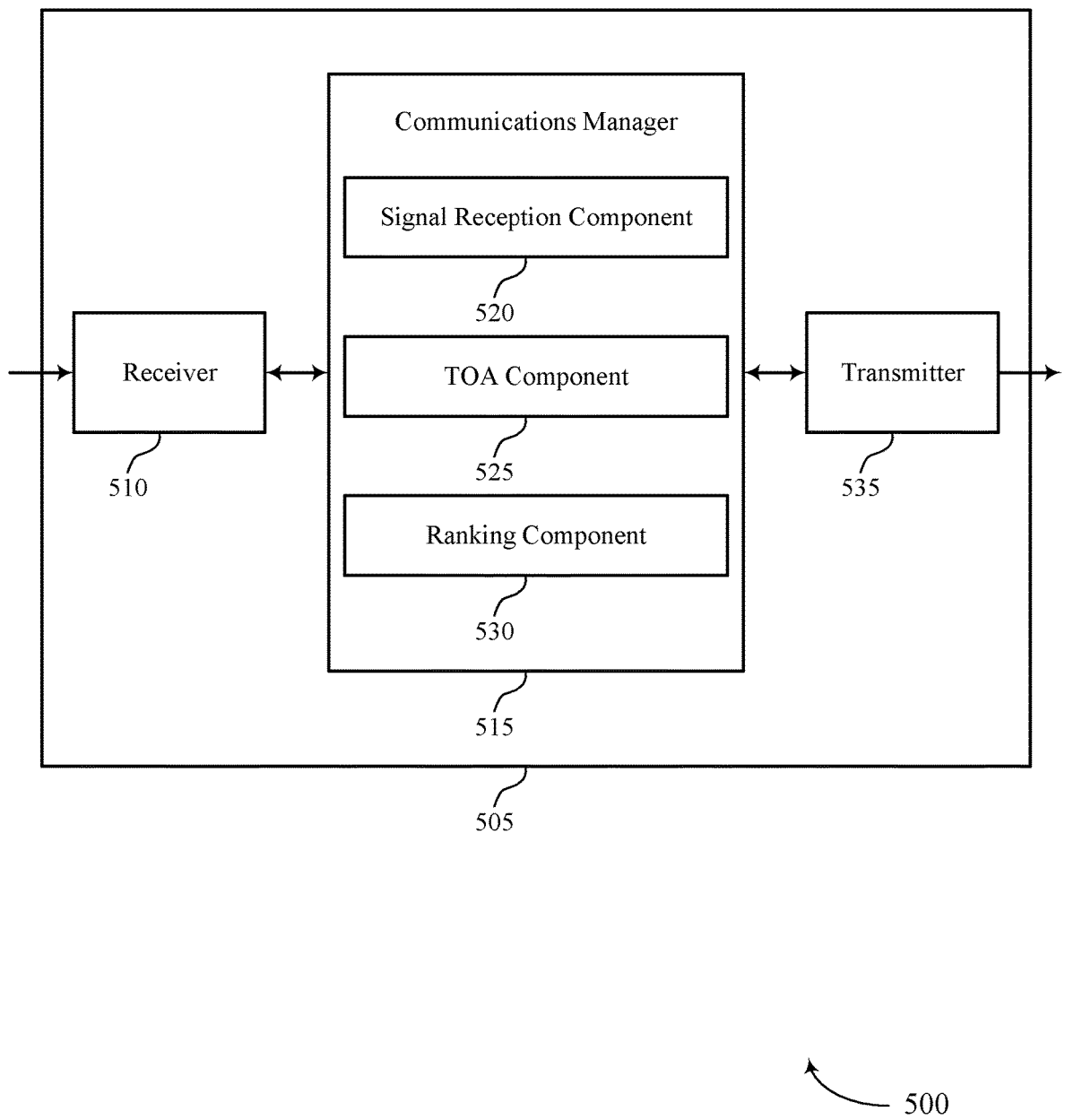

FIG. 5 shows a block diagram 500 of a device 505 that supports techniques to enhance beam reporting for reference signals in accordance with various aspects of the present disclosure. The device 505 may be an example of aspects of a device 405, or a UE 115 as described herein. The device 505 may include a receiver 510, a communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to techniques to enhance beam reporting for reference signals, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a signal reception component 520, a TOA component 525, and a ranking component 530. The communications manager 515 may be an example of aspects of the communications manager 710 described herein.

The signal reception component 520 may receive, from a network node, one or more reference signals.

The TOA component 525 may identify a time of arrival parameter value associated with each of the one or more reference signals.

The ranking component 530 may prioritize each of the one or more reference signals based on the time of arrival parameter value associated with each of the one or more reference signals.

The transmitter 535 may transmit signals generated by other components of the device 505. In some examples, the transmitter 535 may be collocated with a receiver 510 in a transceiver component. For example, the transmitter 535 may be an example of aspects of the transceiver 720 described with reference to FIG. 7. The transmitter 535 may utilize a single antenna or a set of antennas.

A processor of a UE 115 (e.g., controlling the receiver 510, the transmitter 535, or the transceiver 720 as described with reference to FIG. 7) may efficiently measure and report received reference signals. The processor of the UE 115 may operate the receiver 510 to receive reference signals. The processor of the UE 115 may rank the received signals, based on an order of measurement quantities For example, the process of the UE 115 may operate component described herein to prioritize and rank the received reference signals in order of a quantized TOA parameter value. The processor of the UE 115 may operate the transmitter 535 to transmit a measurement report indicating the received signals and the ranked values, along with other values. These techniques may allow a UE 115 to save power and increase battery life by improving the efficiency of RF sensing and reporting.

Figure 6:
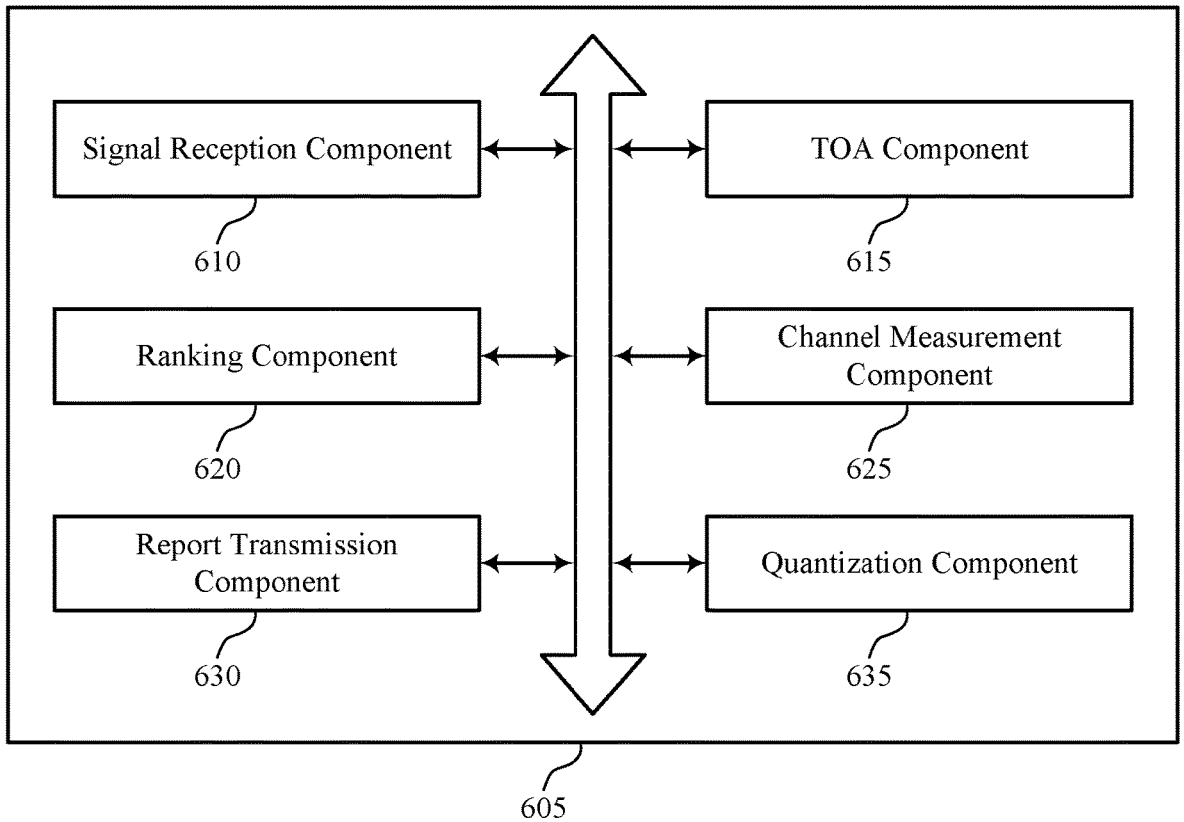
FIG. 6 shows a block diagram of a communications manager that supports techniques to enhance beam reporting for non-communication signals in accordance with various aspects of the present disclosure.

FIG. 6 shows a block diagram 600 of a communications manager 605 that supports techniques to enhance beam reporting for reference signals in accordance with various aspects of the present disclosure. The communications manager 605 may be an example of aspects of a communications manager 415, a communications manager 515, or a communications manager 710 described herein. The communications manager 605 may include a signal reception component 610, a TOA component 615, a ranking component 620, a channel measurement component 625, a report transmission component 630, and a quantization component 635. Each of these components may communicate, directly or indirectly, with one another (e.g., via one or more buses).

The signal reception component 610 may receive, from a network node, one or more reference signals.

In some examples, the signal reception component 610 may determine that two of the one or more channel measurements correspond to the same reference signal.

In some cases, the reference signals include at least one of reference signals for sensing, reference signals for positioning, or a combination thereof.

In some cases, the set of resources are based on a configuration of a set of parameters indicated in the one or more reference signals.

In some cases, the set of parameters include quasi-colocation information indicating a beam corresponding to the reference signal, a source node index of the network node corresponding to the one or more reference signal, time resource information, frequency resource information, periodicity information, repetition information, transmission power, a scrambling sequence, or a combination thereof.

In some cases, the network node is a serving base station, a neighboring base station, or a second UE.

The TOA component 615 may identify a time of arrival parameter value associated with each of the one or more reference signals.

In some examples, the TOA component 615 may determine the reference signal associated with an earliest time of arrival parameter value.

In some cases, the report may include a single instance of the same index indicating the reference signal for each of the two of the one or more channel measurements.

In some cases, the associated time of arrival parameter values for each of the two of the one or more channel measurements corresponding to the same reference signals are different.

The ranking component 620 may prioritize each of the one or more reference signals based on the time of arrival parameter value associated with each of the one or more reference signals.

In some examples, the ranking component 620 may rank the one or more reference signals based on the associated time of arrival parameter value.

The channel measurement component 625 may perform one or more channel measurements of a set of resources based on the one or more reference signals.

The report transmission component 630 may transmit a report to the network node including one or more indices of the one or more reference signals and the time of arrival parameter values associated with each of the one or more reference signals, where the report is based on the prioritizing.

In some examples, transmitting the report including the same index of the reference signal for each of the two of the one or more channel measurements, where the same index includes the associated time of arrival parameter values for each of the two of the one or more channel measurements.

In some cases, the report includes a RSRP measurement, a SINR measurement, a SNR measurement, a CQI, a PMI, or a combination thereof.

In some cases, the report is a channel state information report.

The quantization component 635 may quantize the earliest time of arrival parameter value to a first bit value.

In some examples, the quantization component 635 may quantize the other time of arrival parameter values to a second bit value, where the second bit value is smaller than the first bit value.

Figure 7:
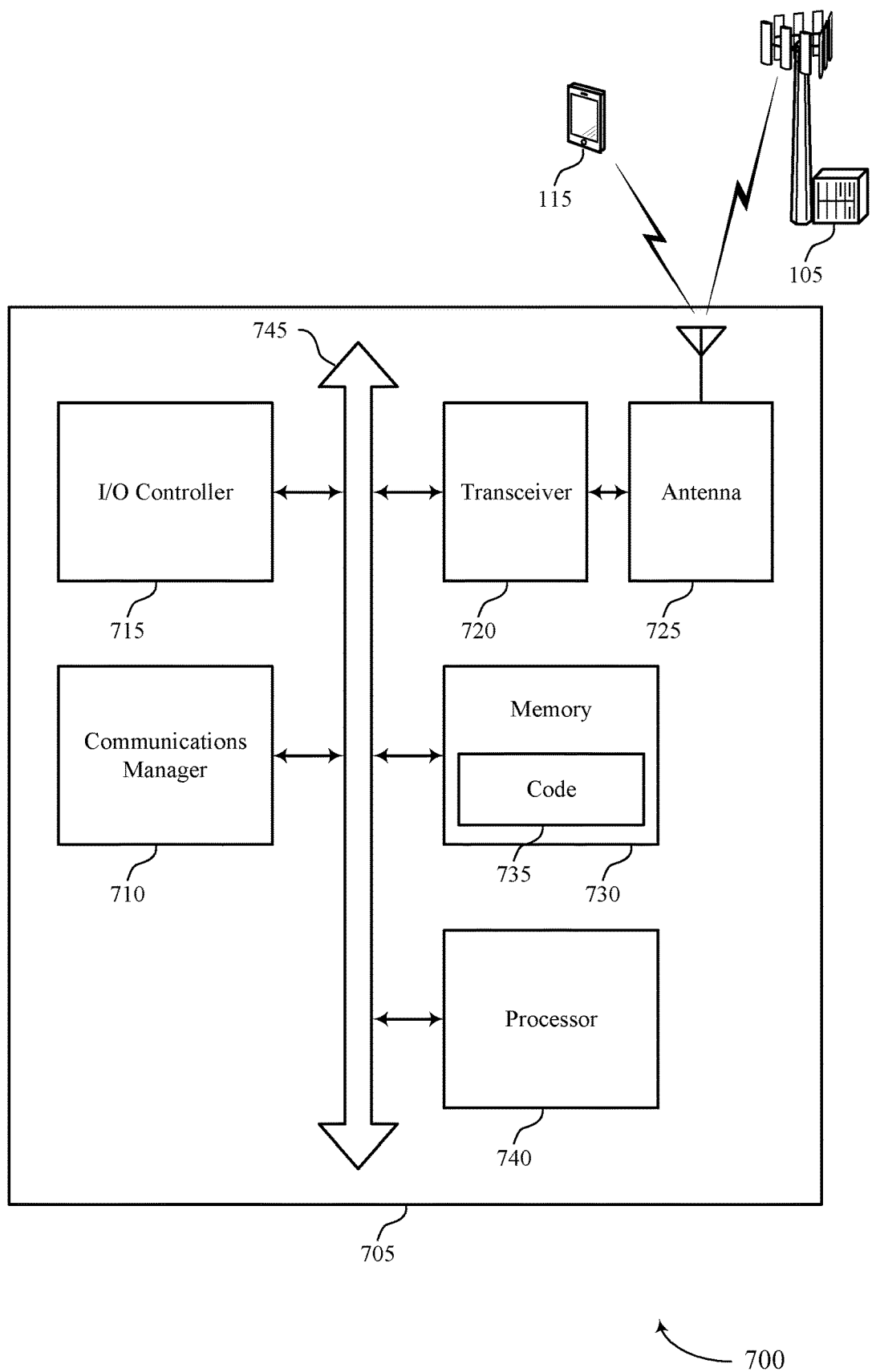
FIG. 7 shows a diagram of a system including a device that supports techniques to enhance beam reporting for non-communication signals in accordance with various aspects of the present disclosure.

FIG. 7 shows a diagram of a system 700 including a device 705 that supports techniques to enhance beam reporting for reference signals in accordance with various aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may receive, from a network node, one or more reference signals, identify a time of arrival parameter value associated with each of the one or more reference signals, and prioritize each of the one or more reference signals based on the time of arrival parameter value associated with each of the one or more reference signals.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include RAM and ROM. The memory 730 may store computer-readable, computer-executable code 735 including instructions that, when executed, cause the processor to perform various functions described herein. In some cases, the memory 730 may contain, among other things, a basic I/O system (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques to enhance beam reporting for reference signals).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
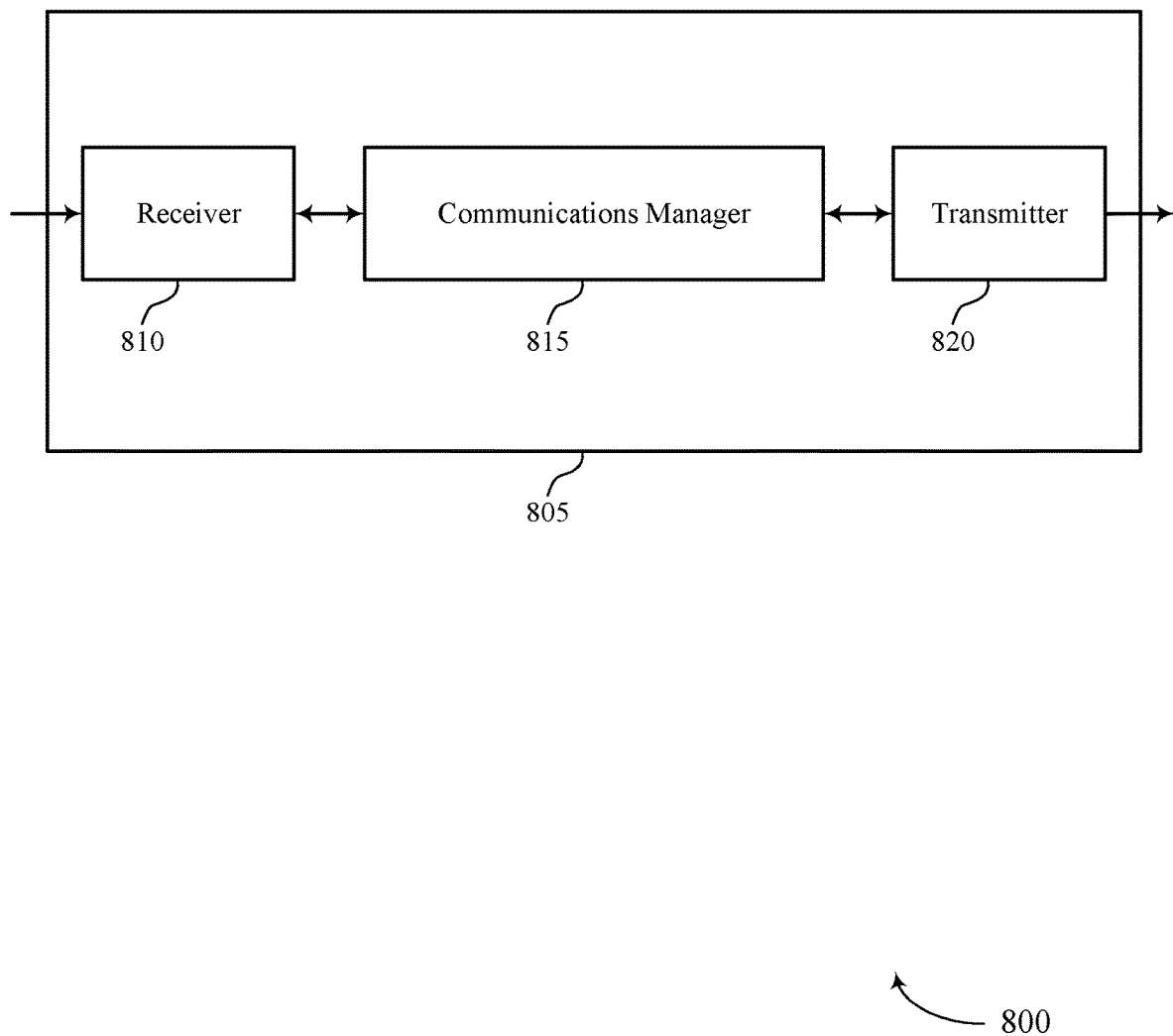
FIGS. 8 and 9 show block diagrams of devices that support techniques to enhance beam reporting for non-communication signals in accordance with various aspects of the present disclosure.

FIG. 8 shows a block diagram 800 of a device 805 that supports techniques to enhance beam reporting for reference signals in accordance with various aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to techniques to enhance beam reporting for reference signals, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may generate one or more reference signals for transmission to a user equipment, where each of the one or more reference signals include a configuration for performing channel measurement, transmit, to one or more UEs, the one or more reference signals, and receive, from at least one of the one or more UEs, a report including one or more indices of the one or more reference signals and time of arrival parameter values associated with each of the one or more reference signals. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver component. For example, the transmitter 820 may be an example of aspects of the transceiver 1120 described with reference to FIG. 11. The transmitter 820 may utilize a single antenna or a set of antennas.

Figure 9:
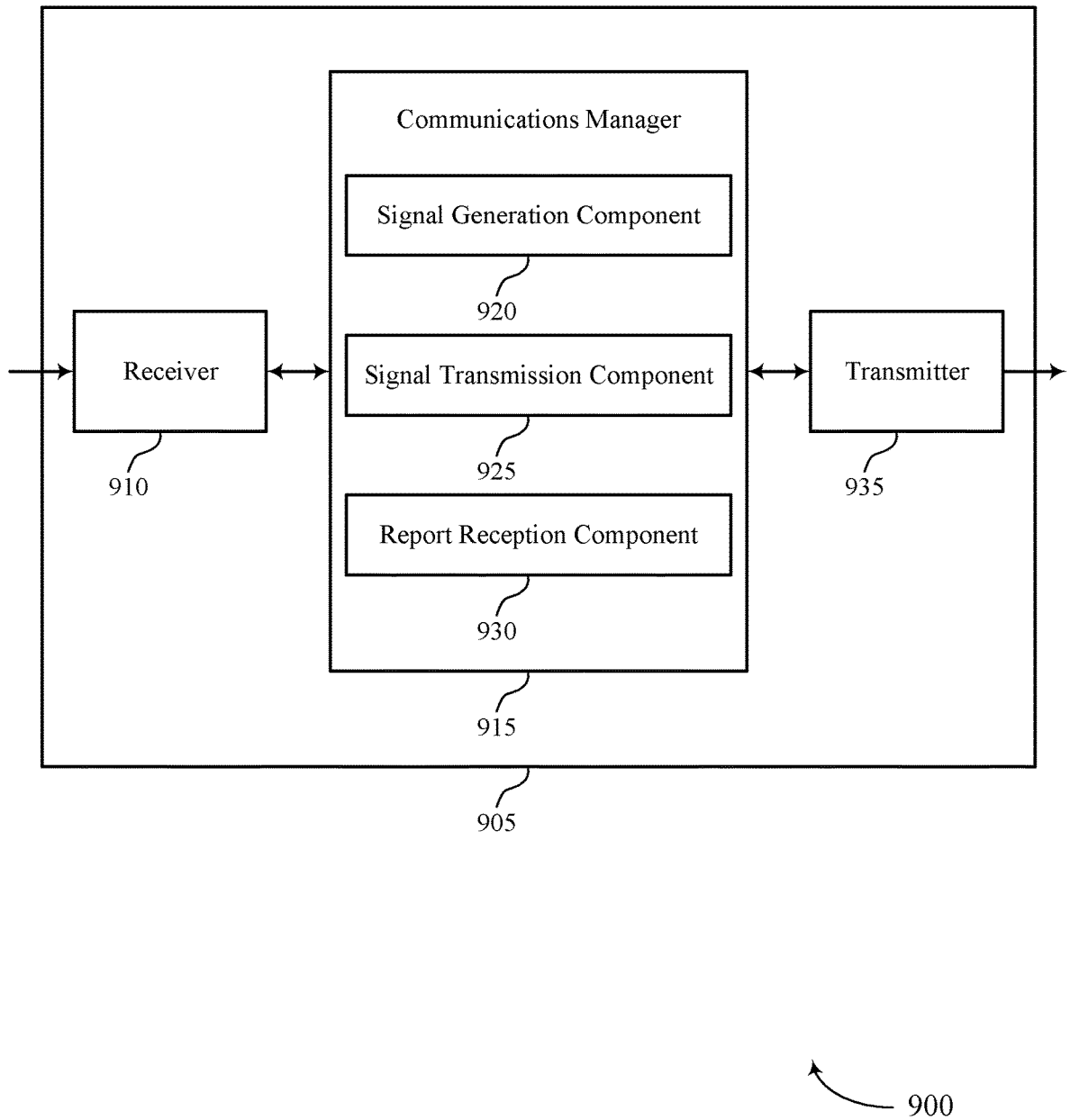

FIG. 9 shows a block diagram 900 of a device 905 that supports techniques to enhance beam reporting for reference signals in accordance with various aspects of the present disclosure. The device 905 may be an example of aspects of a device 805, or a base station 105 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to techniques to enhance beam reporting for reference signals, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a signal generation component 920, a signal transmission component 925, and a report reception component 930. The communications manager 915 may be an example of aspects of the communications manager 1110 described herein.

The signal generation component 920 may generate one or more reference signals for transmission to a user equipment, where each of the one or more reference signals include a configuration for performing channel measurement.

The signal transmission component 925 may transmit, to one or more UEs, the one or more reference signals.

The report reception component 930 may receive, from at least one of the one or more UEs, a report including one or more indices of the one or more reference signals and time of arrival parameter values associated with each of the one or more reference signals.

The transmitter 935 may transmit signals generated by other components of the device 905. In some examples, the transmitter 935 may be collocated with a receiver 910 in a transceiver component. For example, the transmitter 935 may be an example of aspects of the transceiver 1120 described with reference to FIG. 11. The transmitter 935 may utilize a single antenna or a set of antennas.

Figure 10:
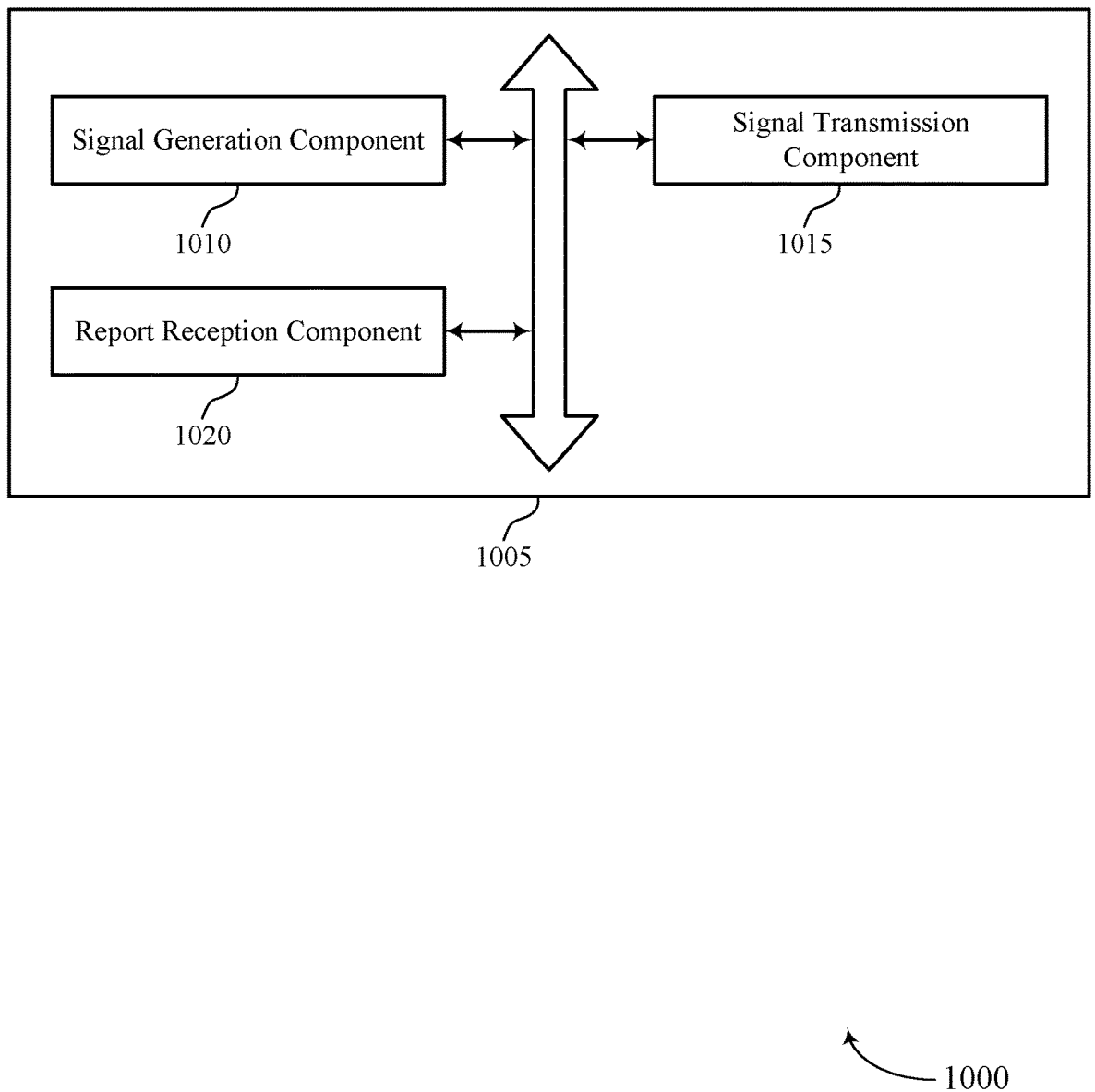
FIG. 10 shows a block diagram of a communications manager that supports techniques to enhance beam reporting for non-communication signals in accordance with various aspects of the present disclosure.

FIG. 10 shows a block diagram 1000 of a communications manager 1005 that supports techniques to enhance beam reporting for reference signals in accordance with various aspects of the present disclosure. The communications manager 1005 may be an example of aspects of a communications manager 815, a communications manager 915, or a communications manager 1110 described herein. The communications manager 1005 may include a signal generation component 1010, a signal transmission component 1015, and a report reception component 1020. Each of these components may communicate, directly or indirectly, with one another (e.g., via one or more buses).

The signal generation component 1010 may generate one or more reference signals for transmission to a user equipment, where each of the one or more reference signals include a configuration for performing channel measurement.

In some cases, the network node is a serving base station, a neighboring base station, or a second UE.

The signal transmission component 1015 may transmit, to one or more UEs, the one or more reference signals.

In some cases, the reference signals include at least one of reference signals for sensing, reference signals for positioning, or a combination thereof.

In some cases, the report may include a single instance of the same index indicating the reference signal for each of the two of the one or more channel measurements.

In some cases, the associated time of arrival parameter values for each of the two of the one or more reference signals are different.

The report reception component 1020 may receive, from at least one of the one or more UEs, a report including one or more indices of the one or more reference signals and time of arrival parameter values associated with each of the one or more reference signals.

In some cases, the report includes a RSRP measurement, a SINR measurement, a SNR measurement, a CQI, a PMI, or a combination thereof.

In some cases, the report is a channel state information report.

In some cases, the report includes the same index of the reference signal for each of the two of the one or more channel measurements, where the same index includes the associated time of arrival parameter values for each of the two of the one or more channel measurements.

In some cases, the configuration includes a set of parameters including at least one of quasi-colocation information indicating a beam corresponding to the reference signal, a source node index of the network node corresponding to the one or more reference signal, time resource information, frequency resource information, periodicity information, repetition information, transmission power, a scrambling sequence, or a combination thereof.

Figure 11:
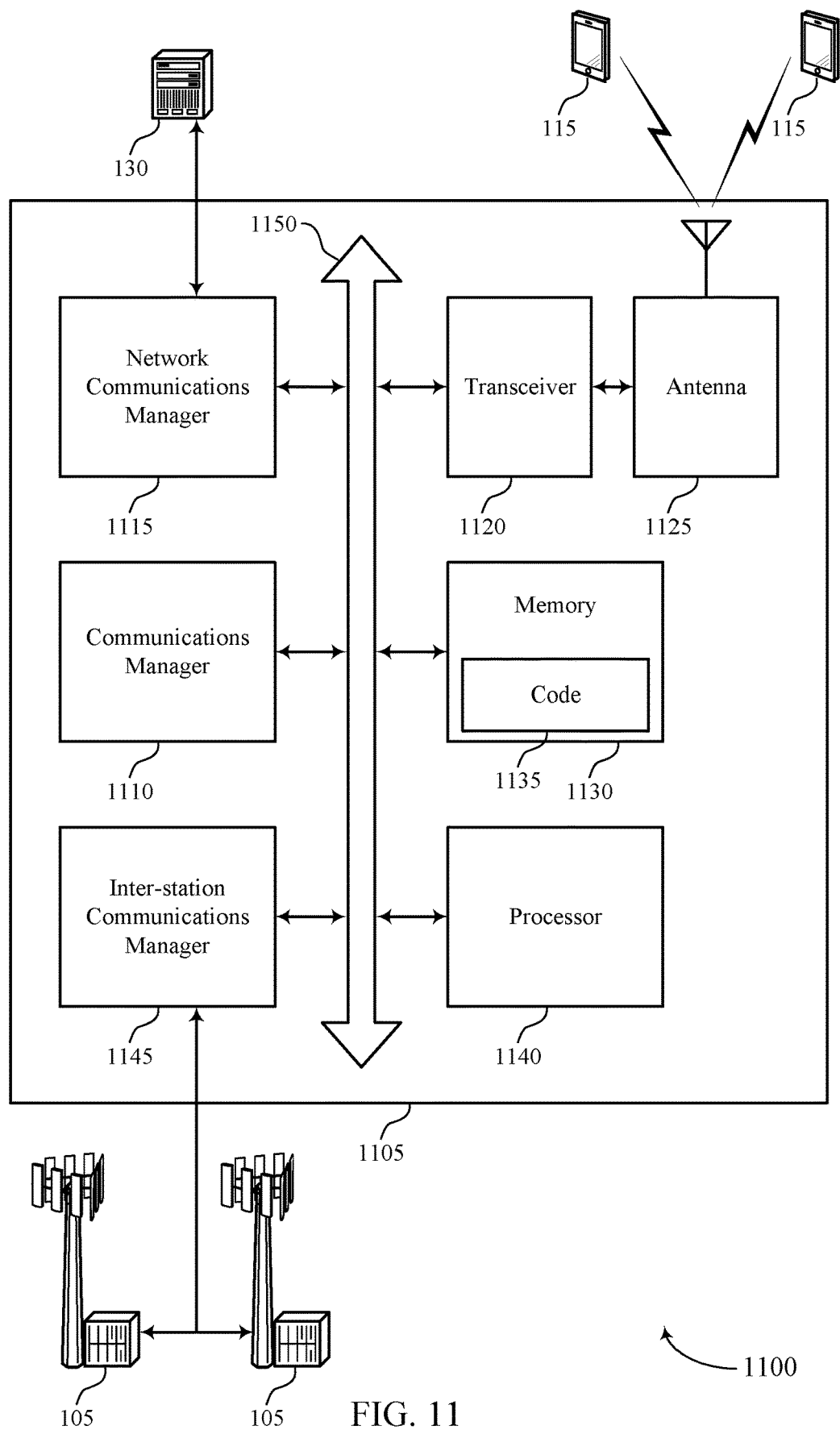
FIG. 11 shows a diagram of a system including a device that supports techniques to enhance beam reporting for non-communication signals in accordance with various aspects of the present disclosure.

FIG. 11 shows a diagram of a system 1100 including a device 1105 that supports techniques to enhance beam reporting for reference signals in accordance with various aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may generate one or more reference signals for transmission to a user equipment, where each of the one or more reference signals include a configuration for performing channel measurement, transmit, to one or more UEs, the one or more reference signals, and receive, from at least one of the one or more UEs, a report including one or more indices of the one or more reference signals and time of arrival parameter values associated with each of the one or more reference signals.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting techniques to enhance beam reporting for reference signals).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
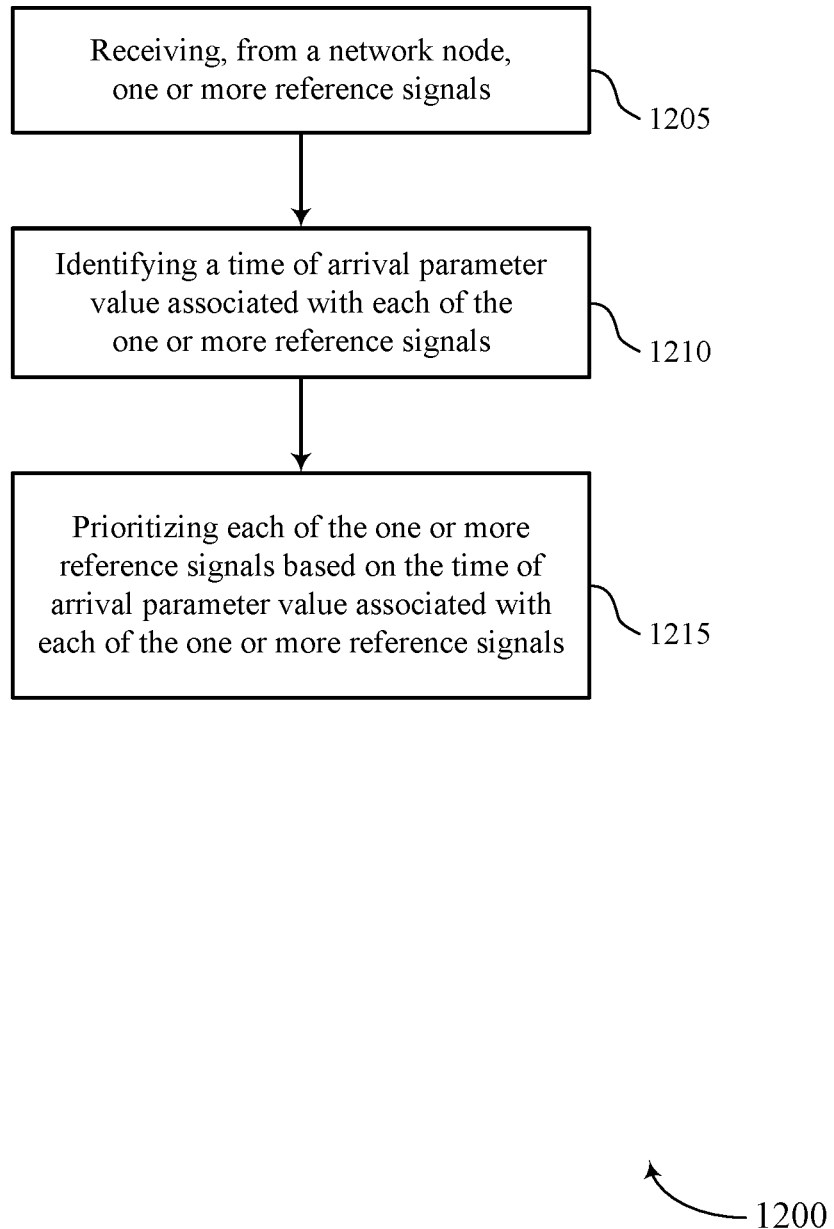
FIGS. 12 through 15 show flowcharts illustrating methods that support techniques to enhance beam reporting for non-communication signals in accordance with various aspects of the present disclosure.

FIG. 12 shows a flowchart illustrating a method 1200 that supports techniques to enhance beam reporting for reference signals in accordance with various aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1205, the UE may receive, from a network node, one or more reference signals. The operations of 1205 may be performed according to the methods described herein. In some examples, aspects of the operations of 1205 may be performed by a signal reception component as described with reference to FIGS. 4 through 7.

At 1210, the UE may identify a time of arrival parameter value associated with each of the one or more reference signals. The operations of 1210 may be performed according to the methods described herein. In some examples, aspects of the operations of 1210 may be performed by a TOA component as described with reference to FIGS. 4 through 7.

At 1215, the UE may prioritize each of the one or more reference signals based on the time of arrival parameter value associated with each of the one or more reference signals. The operations of 1215 may be performed according to the methods described herein. In some examples, aspects of the operations of 1215 may be performed by a ranking component as described with reference to FIGS. 4 through 7.

Figure 13:
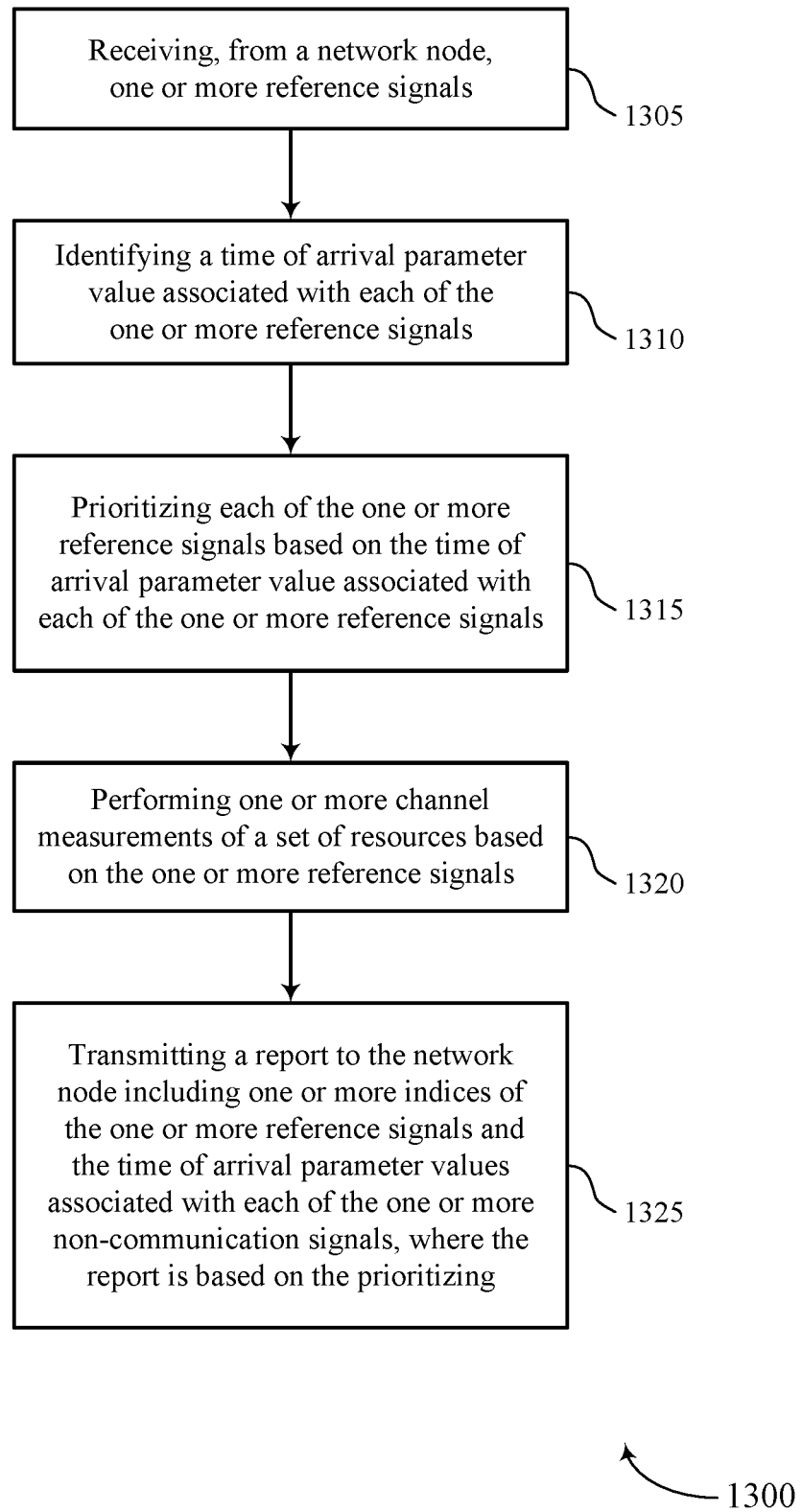

FIG. 13 shows a flowchart illustrating a method 1300 that supports techniques to enhance beam reporting for reference signals in accordance with various aspects of the present disclosure. The operations of method 1300 may be implemented by a UE 115 or its components as described herein. For example, the operations of method 1300 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1305, the UE may receive, from a network node, one or more reference signals. The operations of 1305 may be performed according to the methods described herein. In some examples, aspects of the operations of 1305 may be performed by a signal reception component as described with reference to FIGS. 4 through 7.

At 1310, the UE may identify a time of arrival parameter value associated with each of the one or more reference signals. The operations of 1310 may be performed according to the methods described herein. In some examples, aspects of the operations of 1310 may be performed by a TOA component as described with reference to FIGS. 4 through 7.

At 1315, the UE may prioritize each of the one or more reference signals based on the time of arrival parameter value associated with each of the one or more reference signals. The operations of 1315 may be performed according to the methods described herein. In some examples, aspects of the operations of 1315 may be performed by a ranking component as described with reference to FIGS. 4 through 7.

At 1320, the UE may perform one or more channel measurements of a set of resources based on the one or more reference signals. The operations of 1320 may be performed according to the methods described herein. In some examples, aspects of the operations of 1320 may be performed by a channel measurement component as described with reference to FIGS. 4 through 7.

At 1325, the UE may transmit a report to the network node including one or more indices of the one or more reference signals and the time of arrival parameter values associated with each of the one or more reference signals, where the report is based on the prioritizing. The operations of 1325 may be performed according to the methods described herein. In some examples, aspects of the operations of 1325 may be performed by a report transmission component as described with reference to FIGS. 4 through 7.

Figure 14:
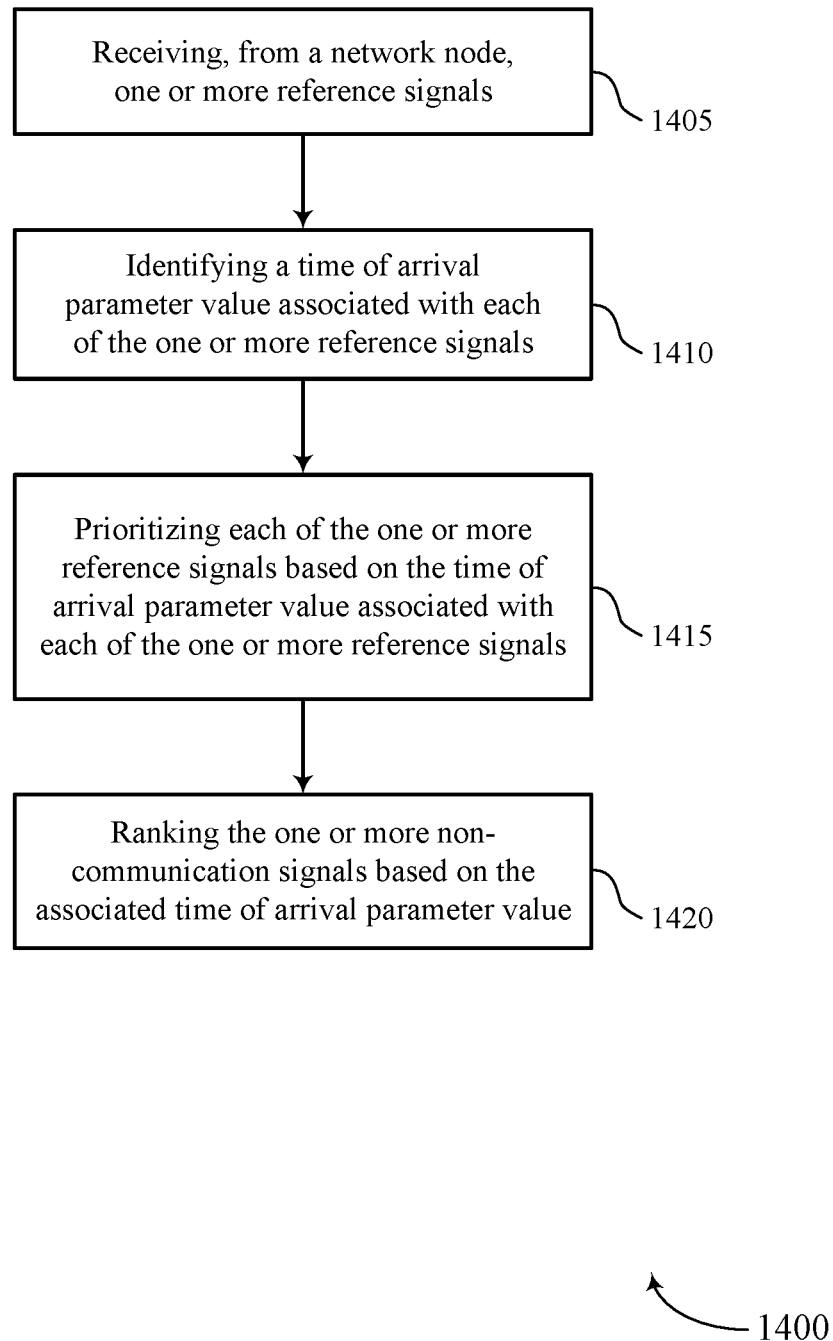

FIG. 14 shows a flowchart illustrating a method 1400 that supports techniques to enhance beam reporting for reference signals in accordance with various aspects of the present disclosure. The operations of method 1400 may be implemented by a UE 115 or its components as described herein. For example, the operations of method 1400 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1405, the UE may receive, from a network node, one or more reference signals. The operations of 1405 may be performed according to the methods described herein. In some examples, aspects of the operations of 1405 may be performed by a signal reception component as described with reference to FIGS. 4 through 7.

At 1410, the UE may identify a time of arrival parameter value associated with each of the one or more reference signals. The operations of 1410 may be performed according to the methods described herein. In some examples, aspects of the operations of 1410 may be performed by a TOA component as described with reference to FIGS. 4 through 7.

At 1415, the UE may prioritize each of the one or more reference signals based on the time of arrival parameter value associated with each of the one or more reference signals. The operations of 1415 may be performed according to the methods described herein. In some examples, aspects of the operations of 1415 may be performed by a ranking component as described with reference to FIGS. 4 through 7.

At 1420, the UE may rank the one or more reference signals based on the associated time of arrival parameter value. The operations of 1420 may be performed according to the methods described herein. In some examples, aspects of the operations of 1420 may be performed by a ranking component as described with reference to FIGS. 4 through 7.

Figure 15:
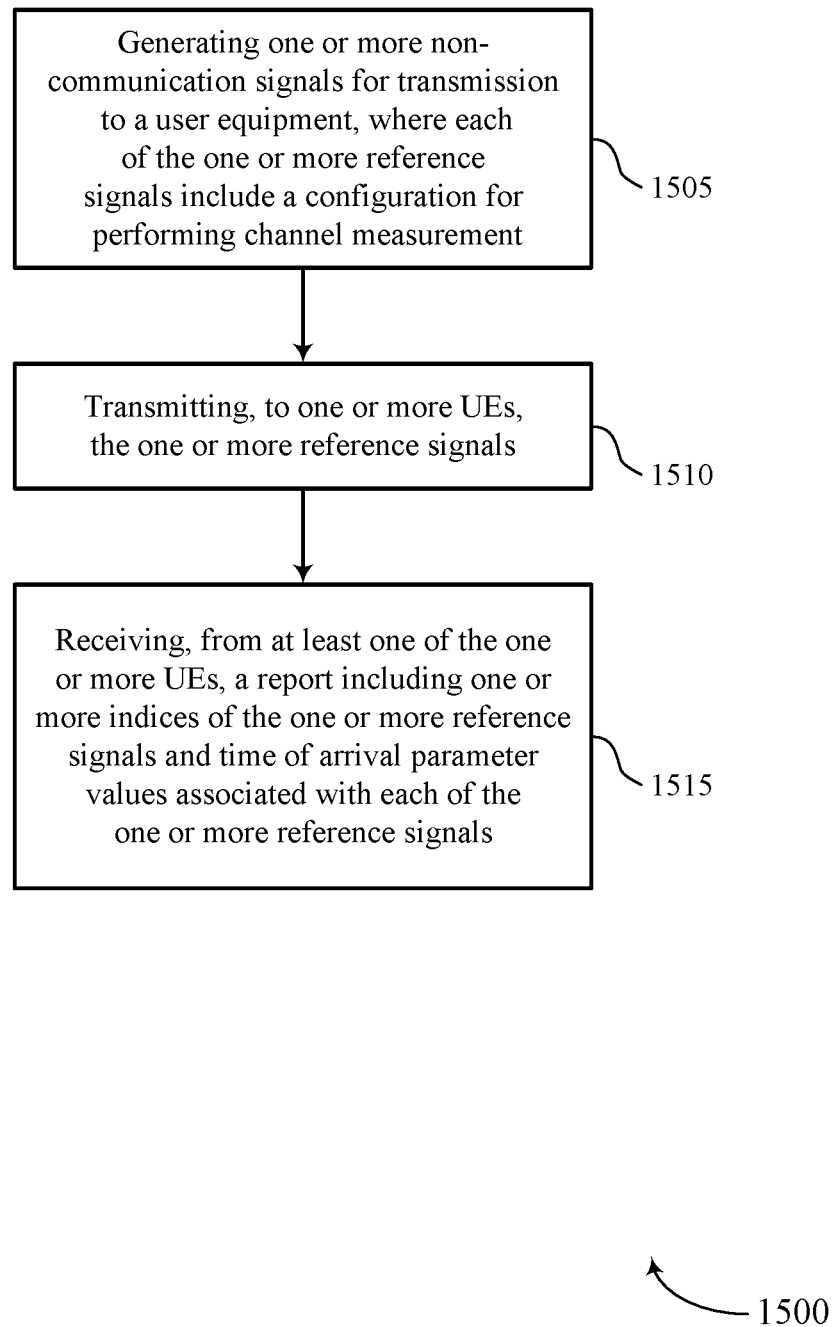

FIG. 15 shows a flowchart illustrating a method 1500 that supports techniques to enhance beam reporting for reference signals in accordance with various aspects of the present disclosure. The operations of method 1500 may be implemented by a base station 105 or its components as described herein. For example, the operations of method 1500 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1505, the base station may generate one or more reference signals for transmission to a user equipment, where each of the one or more reference signals include a configuration for performing channel measurement. The operations of 1505 may be performed according to the methods described herein. In some examples, aspects of the operations of 1505 may be performed by a signal generation component as described with reference to FIGS. 8 through 11.

At 1510, the base station may transmit, to one or more UEs, the one or more reference signals. The operations of 1510 may be performed according to the methods described herein. In some examples, aspects of the operations of 1510 may be performed by a signal transmission component as described with reference to FIGS. 8 through 11.

At 1515, the base station may receive, from at least one of the one or more UEs, a report including one or more indices of the one or more reference signals and time of arrival parameter values associated with each of the one or more reference signals. The operations of 1515 may be performed according to the methods described herein. In some examples, aspects of the operations of 1515 may be performed by a report reception component as described with reference to FIGS. 8 through 11.

The following provides an overview of aspects of the present disclosure:

Aspect 1: A method for wireless communications at a UE, comprising: receiving, from a network node, one or more reference signals; identifying a time of arrival parameter value associated with each of the one or more reference signals; and prioritizing each of the one or more reference signals based at least in part on the time of arrival parameter value associated with each of the one or more reference signals.

Aspect 2: The method of aspect 1, wherein the one or more reference signals comprise at least one of reference signals for sensing, reference signals for positioning, or a combination thereof.

Aspect 3: The method of any of aspects 1 through 2, further comprising: performing one or more channel measurements of a set of resources based at least in part on the one or more reference signals; and transmitting a report to the network node comprising one or more indices of the one or more reference signals and the time of arrival parameter values associated with each of the one or more reference signals, wherein the report is based at least in part on the prioritizing.

Aspect 4: The method of aspect 3, wherein the report comprises a reference signal receive power measurement, a signal to interference noise ratio measurement, a signal to noise ratio measurement, a channel quality indicator, a pre-coding matrix indicator, or a combination thereof.

Aspect 5: The method of any of aspects 3 through 4, wherein the report is a channel state information report.

Aspect 6: The method of any of aspects 3 through 5, wherein the prioritizing comprises: ranking the one or more reference signals based at least in part on the associated time of arrival parameter value.

Aspect 7: The method of aspect 6, further comprising: determining the reference signal associated with an earliest time of arrival parameter value; quantizing the earliest time of arrival parameter value to a first bit value; and quantizing the other time of arrival parameter values to a second bit value, wherein the second bit value is smaller than the first bit value.

Aspect 8: The method of any of aspects 3 through 7, further comprising: determining that two of the one or more channel measurements correspond to the same reference signal; and transmitting the report comprising the same index of the reference signal for each of the two of the one or more channel measurements, wherein the same index comprises the associated time of arrival parameter values for each of the two of the one or more channel measurements.

Aspect 9: The method of aspect 8, wherein the report comprises a single instance of the same index indicating the reference signal for each of the two of the one or more channel measurements.

Aspect 10: The method of any of aspects 8 through 9, wherein the associated time of arrival parameter values for each of the two of the one or more channel measurements corresponding to the same reference signals are different.

Aspect 11: The method of any of aspects 3 through 10, wherein the set of resources are based at least in part on a configuration of a set of parameters indicated in the one or more reference signals.

Aspect 12: The method of aspect 11, wherein the set of parameters comprise quasi-colocation information indicating a beam corresponding to the reference signal, a source node index of the network node corresponding to the one or more reference signal, time resource information, frequency resource information, periodicity information, repetition information, transmission power, a scrambling sequence, or a combination thereof.

Aspect 13: The method of any of aspects 1 through 12, wherein the network node is a serving base station, a neighboring base station, or a second UE.

Aspect 14: A method for wireless communications at a network node, comprising: generating one or more reference signals for transmission to a user equipment, wherein each of the one or more reference signals comprise a configuration for performing channel measurement; transmitting, to one or more UEs, the one or more reference signals; and receiving, from at least one of the one or more UEs, a report comprising one or more indices of the one or more reference signals and time of arrival parameter values associated with each of the one or more reference signals.

Aspect 15: The method of aspect 14, wherein the one or more reference signals comprise at least one of reference signals for sensing, reference signals for positioning, or a combination thereof.

Aspect 16: The method of any of aspects 14 through 15, wherein the network node is a serving base station, a neighboring base station, or a second UE.

Aspect 17: The method of any of aspects 14 through 16, wherein the configuration comprises a set of parameters comprising at least one of quasi-colocation information indicating a beam corresponding to the reference signal, a source node index of the network node corresponding to the one or more reference signal, time resource information, frequency resource information, periodicity information, repetition information, transmission power, a scrambling sequence, or a combination thereof.

Aspect 18: The method of any of aspects 14 through 17, wherein the report comprises a reference signal receive power measurement, a signal to interference noise ratio measurement, a signal to noise ratio measurement, a channel quality indicator, a pre-coding matrix indicator, or a combination thereof.

Aspect 19: The method of any of aspects 14 through 18, wherein the report is a channel state information report.

Aspect 20: The method of any of aspects 14 through 19, wherein the report comprises the same index of the reference signal for each of the two of the one or more channel measurements, the same index comprises the associated time of arrival parameter values for each of the two of the one or more channel measurements.

Aspect 21: The method of aspect 20, wherein the report comprises a single instance of the same index indicating the reference signal for each of the two of the one or more channel measurement.

Aspect 22: The method of any of aspects 20 through 21, wherein the associated time of arrival parameter values for each of the two of the one or more reference signals are different.

Aspect 23: An apparatus for wireless communications at a UE, comprising a processor; memory coupled with the processor; and instructions stored in the memory and executable by the processor to cause the apparatus to perform a method of any of aspects 1 through 13.

Aspect 24: An apparatus for wireless communications at a UE, comprising at least one means for performing a method of any of aspects 1 through 13.

Aspect 25: A non-transitory computer-readable medium storing code for wireless communications at a UE, the code comprising instructions executable by a processor to perform a method of any of aspects 1 through 13.

Aspect 26: An apparatus for wireless communications at a network node, comprising a processor; memory coupled with the processor; and instructions stored in the memory and executable by the processor to cause the apparatus to perform a method of any of aspects 14 through 22.

Aspect 27: An apparatus for wireless communications at a network node, comprising at least one means for performing a method of any of aspects 14 through 22.

Aspect 28: A non-transitory computer-readable medium storing code for wireless communications at a network node, the code comprising instructions executable by a processor to perform a method of any of aspects 14 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving, from a network node, one or more reference signals;
   identifying a time of arrival parameter value associated with each of the one or more reference signals;
   performing one or more channel measurements of a set of resources based at least in part on the one or more reference signals, wherein the set of resources are based at least in part on a configuration of a set of parameters indicated in the one or more reference signals;
   prioritizing each of the one or more reference signals based at least in part on the time of arrival parameter value associated with each of the one or more reference signals; and
   transmitting a report to the network node comprising one or more indices of the one or more reference signals and the time of arrival parameter values associated with each of the one or more reference signals, wherein the report is based at least in part on the prioritizing.

2. The method of claim 1, wherein the one or more reference signals comprise at least one of reference signals for sensing, reference signals for positioning, or a combination thereof.

3. The method of claim 1, wherein the report comprises a reference signal receive power measurement, a signal to interference noise ratio measurement, a signal to noise ratio measurement, a channel quality indicator, a pre-coding matrix indicator, or a combination thereof.

4. The method of claim 1, wherein the report is a channel state information report.

5. The method of claim 1, wherein the prioritizing comprises:
   ranking the one or more reference signals based at least in part on the associated time of arrival parameter value.

6. The method of claim 5, further comprising:
   determining the reference signal associated with an earliest time of arrival parameter value;
   quantizing the earliest time of arrival parameter value to a first bit value; and
   quantizing other time of arrival parameter values to a second bit value, wherein the second bit value is smaller than the first bit value.

7. The method of claim 1, further comprising:
determining that two of the one or more channel measurements correspond to a same reference signal; and
transmitting the report comprising a same index of the reference signal for each of the two of the one or more channel measurements, wherein the same index comprises the associated time of arrival parameter values for each of the two of the one or more channel measurements.

8. The method of claim 7, wherein the report comprises a single instance of the same index indicating the reference signal for each of the two of the one or more channel measurements.

9. The method of claim 7, wherein the associated time of arrival parameter values for each of the two of the one or more channel measurements corresponding to the same reference signals are different.

10. The method of claim 1, wherein the set of parameters comprise quasi-colocation information indicating a beam corresponding to the reference signal, a source node index of the network node corresponding to the one or more reference signal, time resource information, frequency resource information, periodicity information, repetition information, transmission power, a scrambling sequence, or a combination thereof.

11. The method of claim 1, wherein the network node is a serving base station, a neighboring base station, or a second UE.

12. An apparatus for wireless communications at a user equipment (UE), comprising:
a processor,
memory coupled with the processor; and
instructions stored in the memory and executable by the processor to cause the apparatus to:
receive, from a network node, one or more reference signals;
identify a time of arrival parameter value associated with each of the one or more reference signals;
perform one or more channel measurements of a set of resources based at least in part on the one or more reference signals, wherein the set of resources are based at least in part on a configuration of a set of parameters indicated in the one or more reference signals;
prioritize each of the one or more reference signals based at least in part on the time of arrival parameter value associated with each of the one or more reference signals; and
transmit a report to the network node comprising one or more indices of the one or more reference signals and the time of arrival parameter values associated with each of the one or more reference signals, wherein the report is based at least in part on the prioritizing.

13. The apparatus of claim 12, wherein the one or more reference signals comprise at least one of reference signals for sensing, reference signals for positioning, or a combination thereof.

14. The apparatus of claim 12, wherein the report comprises a reference signal receive power measurement, a signal to interference noise ratio measurement, a signal to noise ratio measurement, a channel quality indicator, a pre-coding matrix indicator, or a combination thereof.

15. The apparatus of claim 12, wherein the report is a channel state information report.

16. The apparatus of claim 12, wherein the prioritizing comprises:
rank the one or more reference signals based at least in part on the associated time of arrival parameter value.

17. The apparatus of claim 16, wherein the instructions are further executable by the processor to cause the apparatus to:
determine the reference signal associated with an earliest time of arrival parameter value;
quantize the earliest time of arrival parameter value to a first bit value; and
quantize other time of arrival parameter values to a second bit value, wherein the second bit value is smaller than the first bit value.

18. The apparatus of claim 12, wherein the instructions are further executable by the processor to cause the apparatus to:
determine that two of the one or more channel measurements correspond to a same reference signal; and
transmit the report comprising a same index of the reference signal for each of the two of the one or more channel measurements, wherein the same index comprises the associated time of arrival parameter values for each of the two of the one or more channel measurements.

19. The apparatus of claim 18, wherein the same index indicates the reference signal for each of the two of the one or more channel measurements and comprises a target index.

20. The apparatus of claim 18, wherein the associated time of arrival parameter values for each of the two of the one or more channel measurements corresponding to the same reference signals are different.

21. The apparatus of claim 12, wherein the set of parameters comprise quasi-colocation information indicating a beam corresponding to the reference signal, a source node index of the network node corresponding to the one or more reference signal, time resource information, frequency resource information, periodicity information, repetition information, transmission power, a scrambling sequence, or a combination thereof.

22. The apparatus of claim 12, wherein the network node is a serving base station, a neighboring base station, or a second UE.

23. An apparatus for wireless communications at a user equipment (UE), comprising:
means for receiving, from a network node, one or more reference signals;
means for identifying a time of arrival parameter value associated with each of the one or more reference signals;
means for performing one or more channel measurements of a set of resources based at least in part on the one or more reference signals, wherein the set of resources are based at least in part on a configuration of a set of parameters indicated in the one or more reference signals;
means for prioritizing each of the one or more reference signals based at least in part on the time of arrival parameter value associated with each of the one or more reference signals; and
means for transmitting a report to the network node comprising one or more indices of the one or more reference signals and the time of arrival parameter values associated with each of the one or more reference signals, wherein the report is based at least in part on the prioritizing.

24. The apparatus of claim 23, wherein the one or more reference signals comprise at least one of reference signals for sensing, reference signals for positioning, or a combination thereof.

25. A non-transitory computer-readable medium storing code for wireless communications at a user equipment (UE), the code comprising instructions executable by a processor to:
receive, from a network node, one or more reference signals;
identify a time of arrival parameter value associated with each of the one or more reference signals;
perform one or more channel measurements of a set of resources based at least in part on the one or more reference signals, wherein the set of resources are based at least in part on a configuration of a set of parameters indicated in the one or more reference signals;
prioritize each of the one or more reference signals based at least in part on the time of arrival parameter value associated with each of the one or more reference signals; and
transmit a report to the network node comprising one or more indices of the one or more reference signals and the time of arrival parameter values associated with each of the one or more reference signals, wherein the report is based at least in part on the prioritizing.

26. The method of claim 1, further comprising:
determining one or more attributes of an object from which the one or more reference signals is reflected based at least in part on the one or more channel measurements.

27. The method of claim 26, wherein the one or more attributes comprise at least one of a speed of the object, a location of the object, and angle of the object with respect to the UE, or a combination thereof.

28. The apparatus of claim 12, wherein the instructions are further executable by the processor to cause the apparatus to:
determine one or more attributes of an object from which the one or more reference signals is reflected based at least in part on the one or more channel measurements.

29. The apparatus of claim 28, wherein the one or more attributes comprise at least one of a speed of the object, a location of the object, and angle of the object with respect to the UE, or a combination thereof.

* * * * *